United States Patent
Johnson

[11] Patent Number: 6,110,586
[45] Date of Patent: Aug. 29, 2000

[54] FASTENER TAPE FABRICATION EQUIPMENT AND PROCESS

[75] Inventor: James R. Johnson, Chamblee, Ga.

[73] Assignee: Illinois Tool Works Inc., Glenview, Ill.

[21] Appl. No.: 09/140,565

[22] Filed: Aug. 27, 1998

[51] Int. Cl.$^7$ ................................................. B65D 33/18
[52] U.S. Cl. ........................... 428/352; 156/66; 383/61; 383/63; 383/65; 383/211; 493/213
[58] Field of Search .................. 383/61, 63, 65, 383/210, 211; 493/213; 428/352; 206/813; 156/66

[56] References Cited

U.S. PATENT DOCUMENTS

| | | | |
|---|---|---|---|
| 2,142,194 | 1/1939 | Karfiol | 206/813 |
| 2,565,509 | 8/1951 | Marcin | 206/813 |
| 2,914,167 | 11/1959 | Holtz | 206/813 |
| 3,780,781 | 12/1973 | Uramoto | 383/61 |
| 4,191,230 | 3/1980 | Ausnit | 383/61 |
| 4,812,074 | 3/1989 | Ausnit et al. | 493/213 |
| 4,874,257 | 10/1989 | Inagaki | 383/63 |
| 4,925,316 | 5/1990 | Van Erden et al. | 383/63 |
| 4,949,527 | 8/1990 | Boeckmann et al. | 383/63 |
| 4,966,470 | 10/1990 | Thompson et al. | 383/78 |
| 5,053,091 | 10/1991 | Gijam et al. | 383/63 |
| 5,077,064 | 12/1991 | Hustad et al. | 383/65 |
| 5,092,684 | 3/1992 | Weeks | 383/61 |
| 5,100,246 | 3/1992 | La Pierre et al. | 383/61 |
| 5,121,997 | 6/1992 | La Pierre et al. | 383/63 |
| 5,186,543 | 2/1993 | Cochran | 383/61 |
| 5,224,779 | 7/1993 | Thompson et al. | 383/211 |
| 5,358,334 | 10/1994 | Simonsen | 383/61 |
| 5,456,928 | 10/1995 | Hustad et al. | 383/61 |
| 5,524,765 | 6/1996 | Gutentag | 206/813 |
| 5,609,420 | 3/1997 | Palmisano | 383/61 |
| 5,875,611 | 3/1999 | Plourde | 383/61 |

Primary Examiner—Stephen P. Garbe
Attorney, Agent, or Firm—Pitney, Hardin, Kipp and Szuch LLP

[57] ABSTRACT

Fastener tape fabrication equipment and process for manufacturing fastener tape for attachment in an opening in the top of a reclosable plastic bag. A continuous strip of intermediate layer for carrying a continuous strip of profile fastener is provided from a delivery assembly with a constant tension to an applicator assembly. A pair of laterally spaced adhesive surfaces are also carried upon the intermediate layer. The intermediate layer passes over a generally V-shaped member, mounted upon the delivery assembly, in order to be folded. The profile is inserted into the fold of the intermediate layer. Circumferentially grooved wheels then align the profile with the intermediate layer as the intermediate layer and profile are directed into a plurality of sealing bars upon the applicator assembly to form the fastener tape. A first set of sealing bars seal the profile to the intermediate layer and a second set of sealing bars seal the adhesive surfaces together to form a peel seal on the intermediate layer. The resulting fastener tape is then collected on a windup roll.

19 Claims, 17 Drawing Sheets

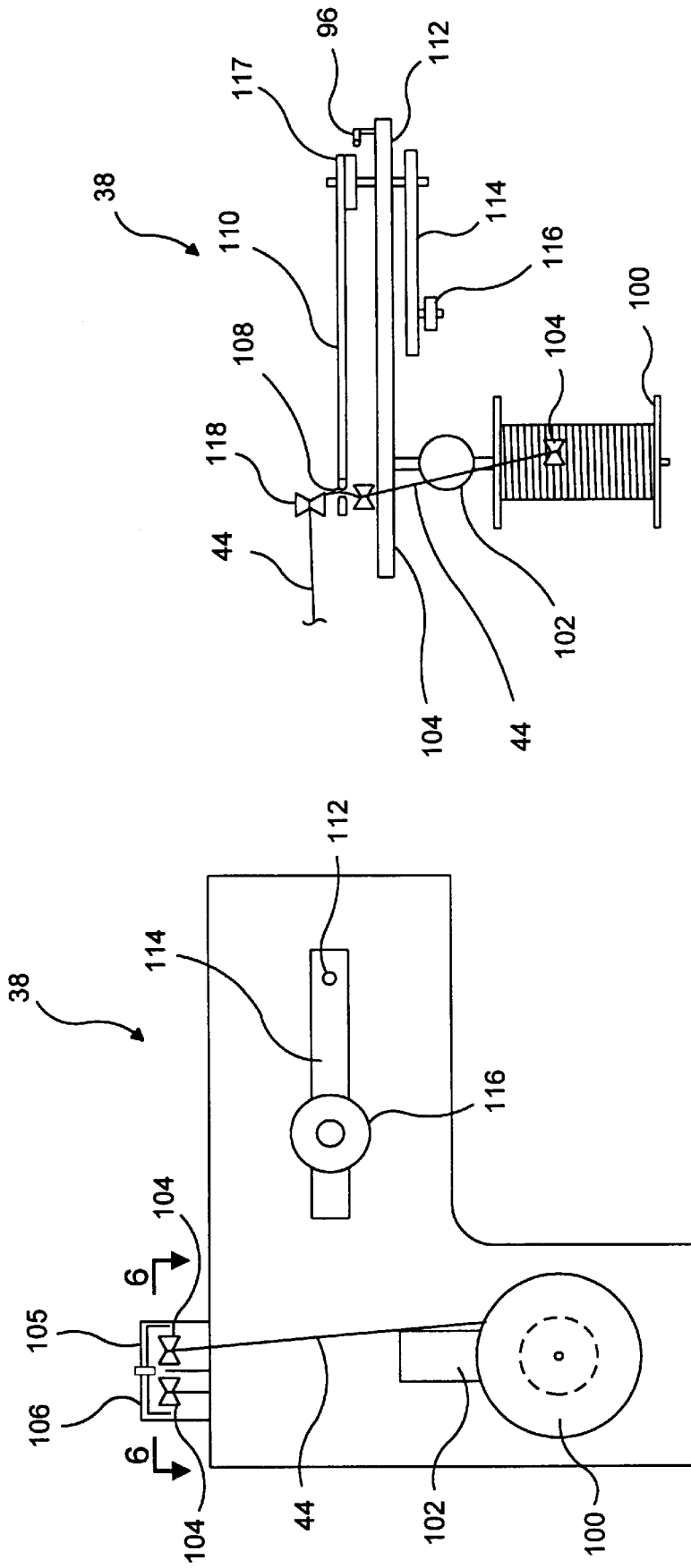

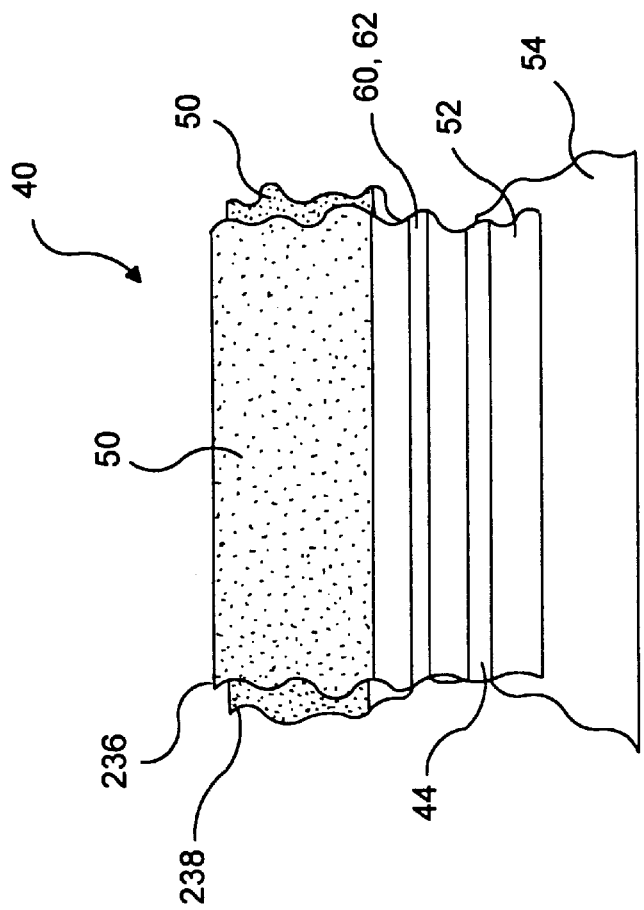
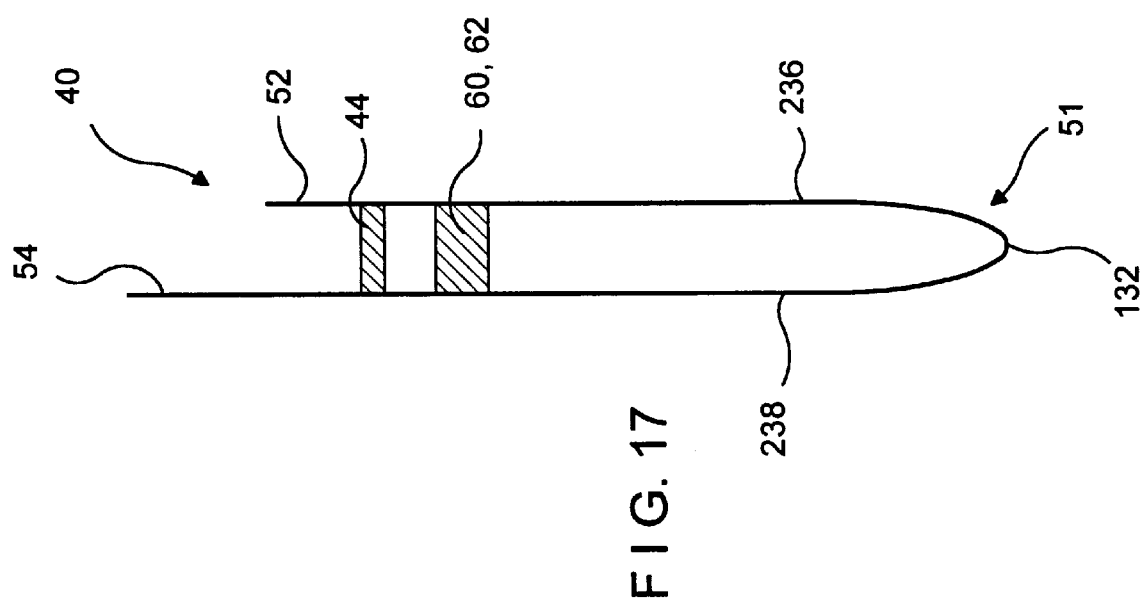

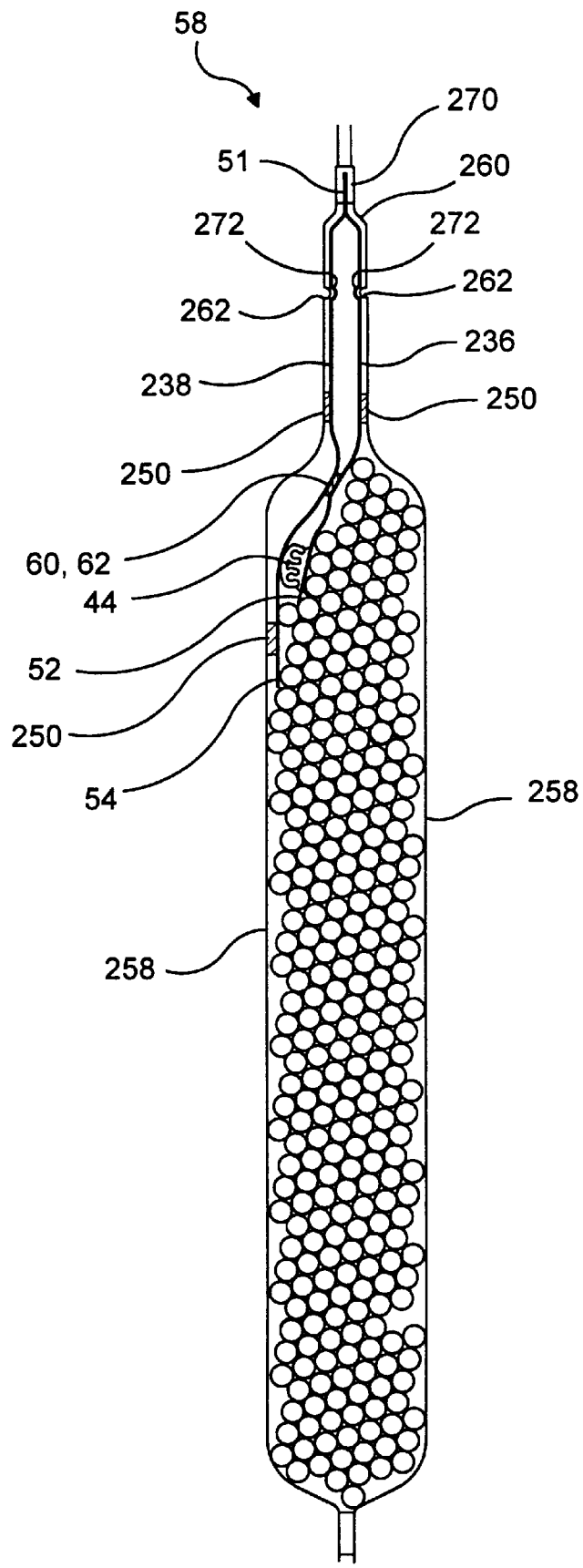
F I G. 22

FASTENER TAPE FABRICATION EQUIPMENT AND PROCESS

FIELD OF THE INVENTION

The present invention relates to reclosable plastic bags. This invention more particularly pertains to the manufacture of a tape having reclosable fasteners thereon and adapted to be mounted in an opening of a reclosable bag.

BACKGROUND OF THE INVENTION

Reclosable plastic bags having interlocking pressure-sealable profile fasteners are well known and have a variety of useful applications such as the storage of household goods. The recent increase in consumer demand for reclosable bags has been coupled with a demand for higher quality profile fasteners in these bags. To meet these demands, manufacturers must develop cost effective and reliable methods of producing reclosable bags that are suitable for a consumer's particular purpose.

Consumers prefer reclosable bags in which the reclosable opening is across the top of the bag. Until recently, however, most reclosable plastic bags were manufactured with the reclosable opening located along a vertical side of the bag rather than across the top of the bag. Simply, it was easier for manufacturers using conventional equipment and processes to attach fasteners along the side of the bag than it was to attach fasteners across the top of the bag. Recent advances in manufacturing equipment and materials have allowed some manufacturers to produce reclosable bags with the reclosable openers across the top of the bag. For example, such equipment is available from AMI/Rec-Pro, Inc. in Atlanta, Ga., USA.

Typically, most commercially available reclosable plastic bags are formed of thermoplastic, such as polyethylene. An opening in the plastic bag is equipped with a plastic profile fastener which allows the plastic bag to be opened and resealed when accessing the contents of the plastic bag. These profiles include a male profile and a female profile configured to interlock and form a continuous closure when aligned and pressed together. Interlocked male and female profiles are commonly referred to, in the singular sense, as a profile fastener, zipper profile, or merely as a profile.

There is one type of extrusion process used to extrude materials for use at the top of a bag that is known as a flange zipper process. In such a process, the profile is extruded to form flanged portions extending from the profile fastener. However, there are problems in sealing extruded, flanged profile directly to the walls of the plastic bag (referred to as the bag walls) due to the thickness of the flanged portions. Specifically, extruded, flanged profile has a limitation as to how thin the flanges can be integrally extruded. The extrusion process results in a flanged area having a thickness significantly greater than if a similar type profile was separately manufactured and attached to a separately manufactured intermediate layer.

As an alternative to attaching flange zipper profiles directly to the bag walls, the profile may only be attached to an intermediate layer of film. The intermediate layer with the attached profile is then attached to the bag walls. The combination of the profile and the intermediate layer is commonly referred to as "fastener tape." The fastener tape and bag walls are suitably interconnected by generally known means, such as heat sealing, wherein the intermediate layer is sealed to the walls of the base material. The use of an intermediate layer permits the use of profiles that are made of a different material than the plastic bag walls. These different materials may be thermally incompatible. It is desirable to produce an intermediate layer in the thinnest manner possible in order to minimize the amount of heat necessary to attach the intermediate layer to the plastic bag. The intermediate layer is more effectively attached to a plastic bag, with a minimal amount of heat, when the intermediate layer is in its thinnest form.

Excess heat in the manufacture of reclosable plastic bags promulgates defects. For example, if the intermediate layer or the profile comes into contact with excessive heat, the seal between the walls of the plastic bag and the intermediate layer may become damaged or the profile may become deformed. Such damage may be identified by an inoperable profile, wrinkles or creases in the walls of the plastic bag, or curls at the edges of the bag near the profile. Heat sealing is even more difficult when the walls of the bag are something other than polyethylene, for example polypropylene.

There are many problems associated with existing equipment for forming fastener tape. For example, existing machines cannot attach the profile to the intermediate layer with the required accuracy to form a commercially acceptable seal. Simply, the window of registration required to seal the profile to the intermediate layer is not consistently maintained when forming fastener tape because there is no mechanism for delivering the intermediate layer with a constant tension to the fastener tape fabrication equipment. Slack in the intermediate layer as it enters and passes through the fabrication equipment prevents the intermediate layer from being properly manipulated into a suitable configuration for receiving the profile.

In response to the realized inadequacies of known fastener tape fabrication equipment, it became clear that there is a need for an apparatus and method which aligns the profile with the intermediate layer with the required accuracy to form commercially acceptable fastener tape. This new apparatus must allow the intermediate layer to be delivered in a consistent manner and to be configured in a particular manner in order to receive and mate with the profile. What is needed is an apparatus that is capable of maintaining a constant tension on the intermediate layer and the profile, while accurately positioning the profile on the intermediate layer, as the profile and intermediate layer are being sealed together.

BRIEF SUMMARY OF THE INVENTION

The present invention alleviates or solves the above-described problems in the prior art by providing an improved method and apparatus for fabricating fastener tape to be utilized in the manufacture of reclosable plastic bags. The present method and apparatus satisfies the need for an efficient and accurate method of sealing the profile to the intermediate layer when forming fastener tape.

In accordance with the invention, this objective is accomplished by providing delivery and applicator assemblies. The delivery assembly includes a plurality of rollers configured for delivering the intermediate layer to the applicator assembly. The tension of the intermediate layer between the rollers is controlled by a motorized drive roller. At least one of the plurality of rollers is fixed to the distal end of a pivoting arm. The proximal end of the arm is attached to an axis which passes through the delivery assembly to a cam. As the tension of the intermediate layer in the rollers increases and decreases, the arm and cam rotate. The rotation of the cam is detected and a signal is sent to the motorized roller to change the rate of speed of the intermediate layer through the rollers.

Also on the delivery assembly is a generally V-shaped panel member for folding the intermediate layer. The intermediate layer passes over a declined surface of the V-shaped panel member and over an apex to define a fold line in the intermediate layer. Before the folded intermediate layer is received by the applicator assembly, the profile fastener is inserted into the folded intermediate layer and oriented parallel to the machine direction of the intermediate layer. On the applicator assembly are a plurality of wheels having circumferential grooves sized for receiving the profile. The wheels align the profile with the intermediate layer as the intermediate layer and profile are directed into two pairs of opposed sealing bars to form the fastener tape. The sealing bars of each set are moveable with respect to one another from a spaced clearance position into a clamping and sealing position. In the clamping and sealing position, the first set of sealing bars seal the profile to the intermediate layer and the second set of sealing bars seal a pair of adhesive surfaces to one another to form a peal seal. The sealing surfaces of each set of sealing bars are offset from one another.

Fastener tape fabrication equipment and fastener tape formed in accordance with the present invention has a number of advantages. An important advantage of the novel fabrication equipment is the apparatus' ability to manipulate the intermediate layer in a consistent manner and align the profile with the intermediate layer to form the fastener tape.

Accordingly, an object of this invention is to provide improved fastener tape fabrication equipment that overcomes the aforementioned inadequacies of prior art fabrication equipment.

Another object of the present invention is to provide tape fastener fabrication equipment capable of reducing the amount of defects in the resulting fastener tape.

Still another object of the present invention is to provide a structurally simple and economical device for manufacturing fastener tape for use in the assembly of reclosable plastic bags.

Yet another object of the present invention is to continuously provide an intermediate layer and a profile with balanced tensions for sealing to one another to yield a finished fastener tape that is straight.

Still yet another object of the present invention is to more accurately control the attachment of the profile fastener to the intermediate layer.

Still another object is to reactivate a heat reactivable peal seal adhesive at the fastener tape manufacturing operation.

The foregoing has broadly outlined some of the more pertinent objects and features of the present invention. These should be construed to be merely illustrative of some of the more prominent features and applications of the intended invention. Many other beneficial results can be obtained by applying the disclosed invention in a different manner or by modifying the disclosed embodiments. Accordingly, other objects and a more comprehensive understanding of the invention may be obtained by referring to the detailed description of the preferred embodiment taken in conjunction with the accompanying drawings, in addition to the scope of the invention defined by the claims. For a more succinct understanding of the nature and objects of the present invention, reference should be directed to the following detailed description taken in connection with the accompanying drawings.

BRIEF DESCRIPTION OF THE DRAWINGS

FIG. 5 is a front side view of profile fastener being unwound and passing over the top of the profile unwind assembly.

FIG. 6 is a top view of the profile unwind assembly taken along line 6—6 of FIG. 5.

FIG. 17 is a cross-sectional view of one embodiment of a fastener tape formed in accordance with the present invention.

FIG. 18 is a partial view of one embodiment of the fastener tape described herein.

FIG. 22 is a cross-sectional view illustrating a modification of the embodiment of the reclosable bag shown in FIG. 21.

DETAILED DESCRIPTION OF THE PREFERRED EMBODIMENT

Figure 1:
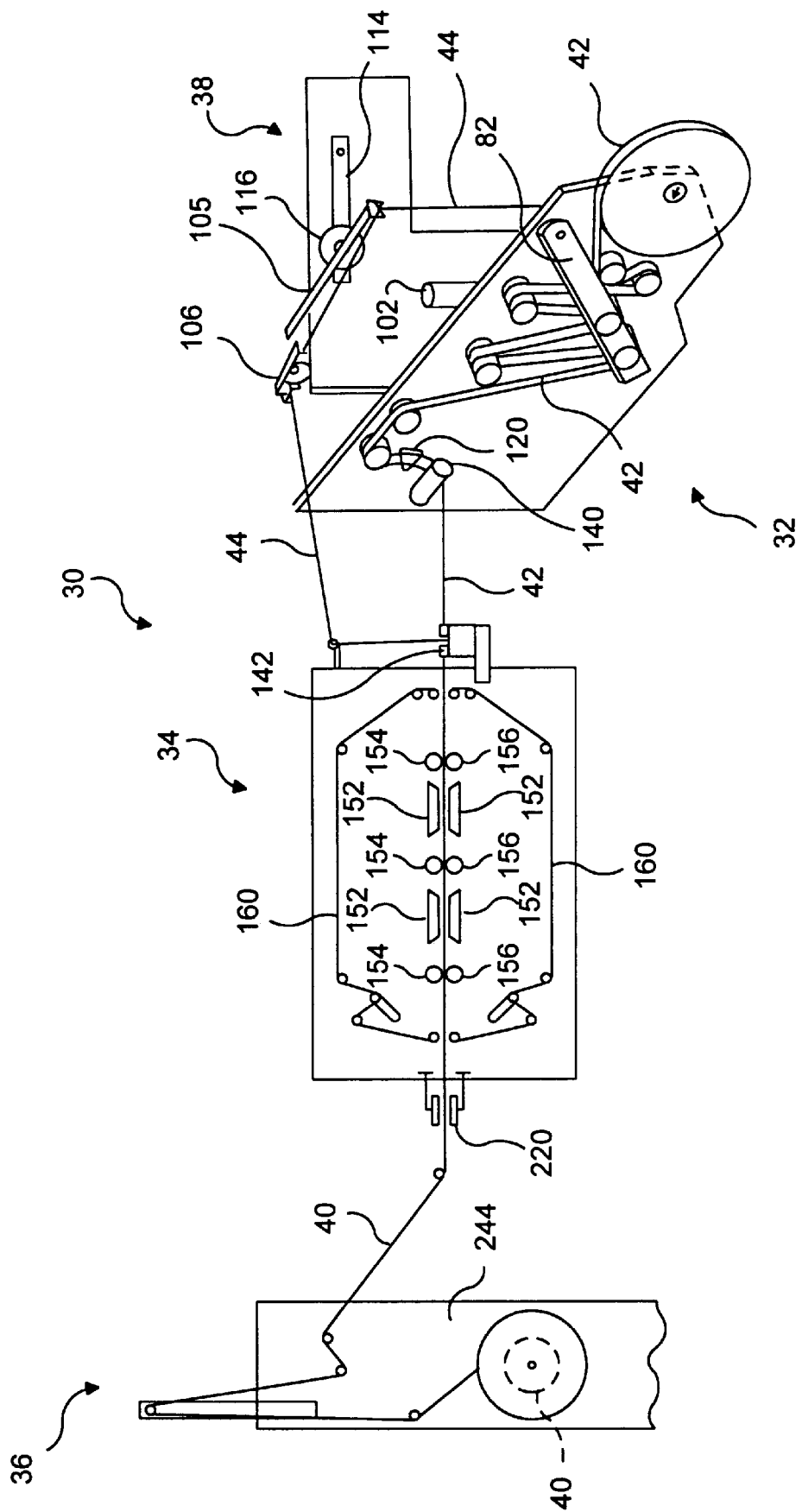
FIG. 1 illustrates one embodiment of the tape fastener fabrication equipment of the present invention.
Figure 2:
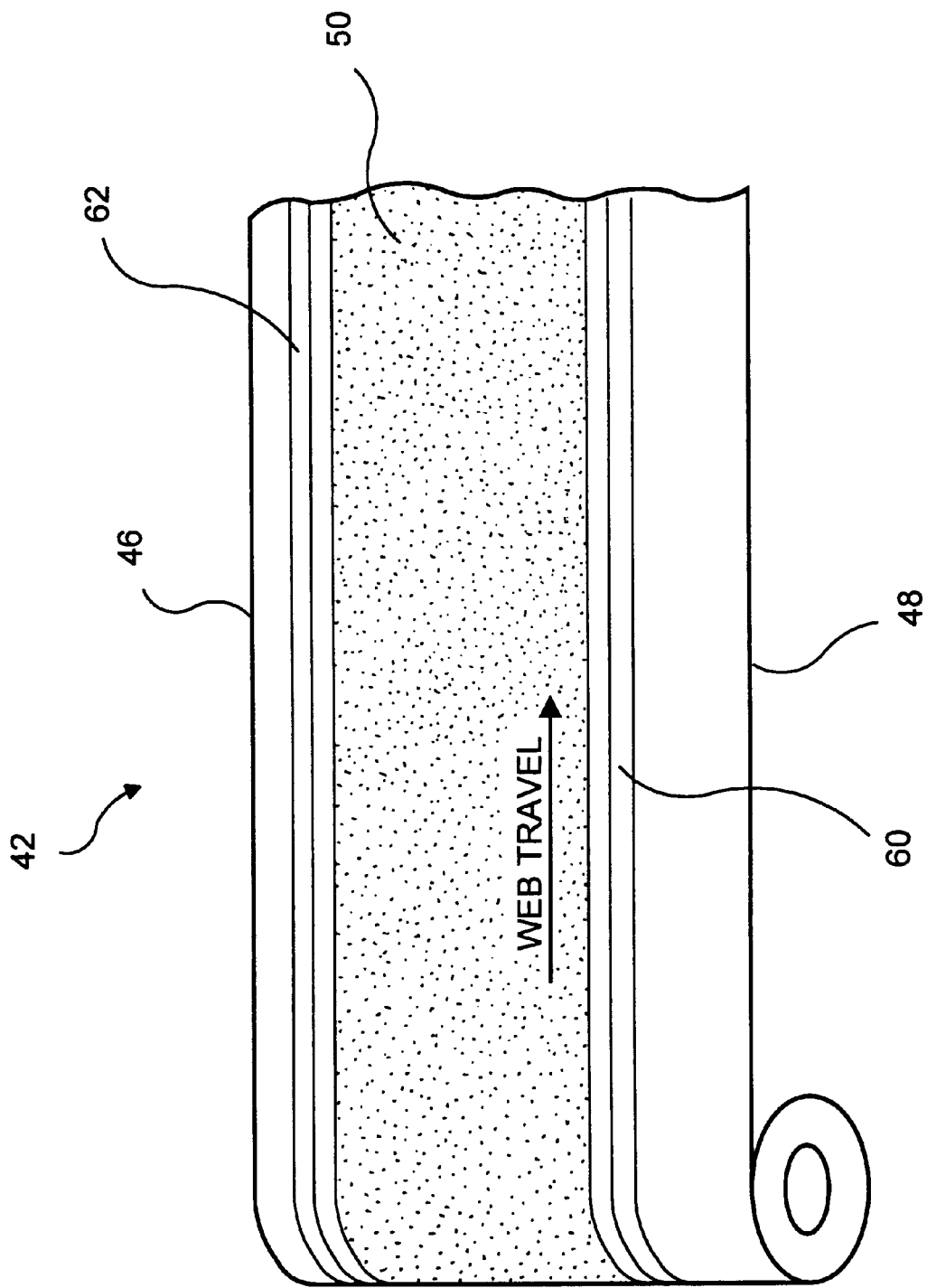
FIG. 2 is a front perspective view of a continuous roll of intermediate layer.
Figure 7:
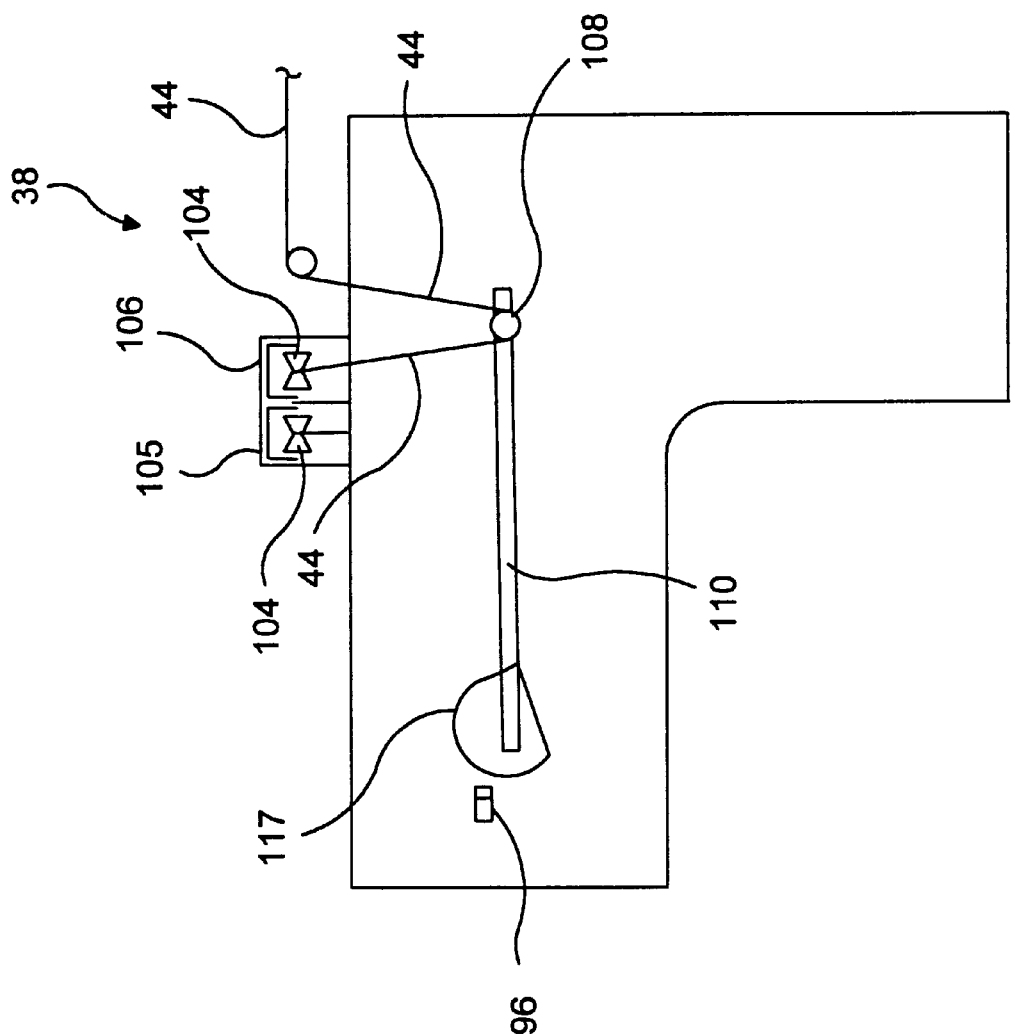
FIG. 7 illustrates the back side view of the profile unwind assembly shown in FIGS. 5 and 6.
Figure 8:
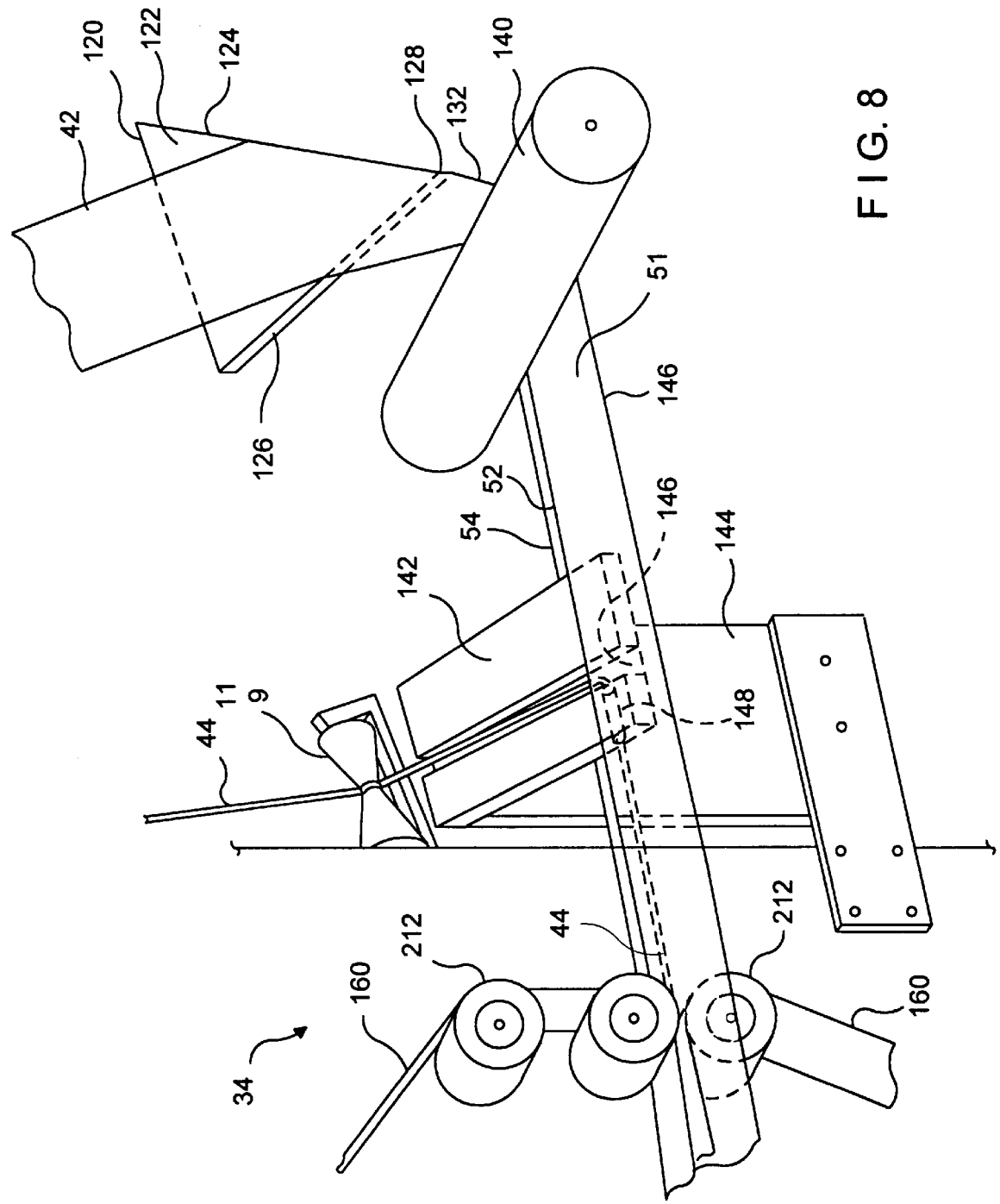
FIG. 8 illustrates a generally V-shaped panel member and a guide roller for folding the intermediate layer, and a guide for positioning the profile in the folded intermediate layer.
Figure 19:
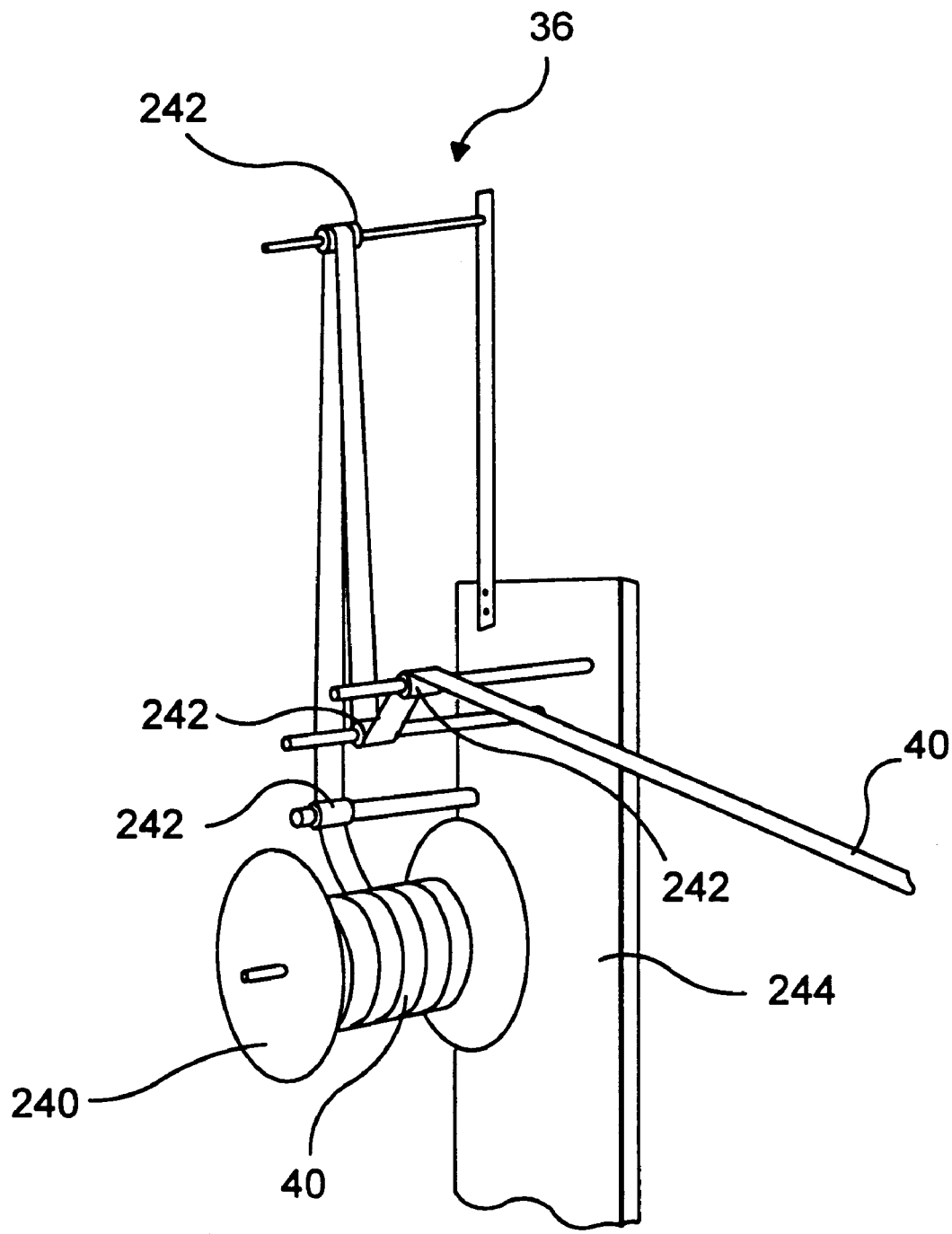
FIG. 19 is a right side perspective view of a collection assembly for collecting fastener tape.
Figure 20:
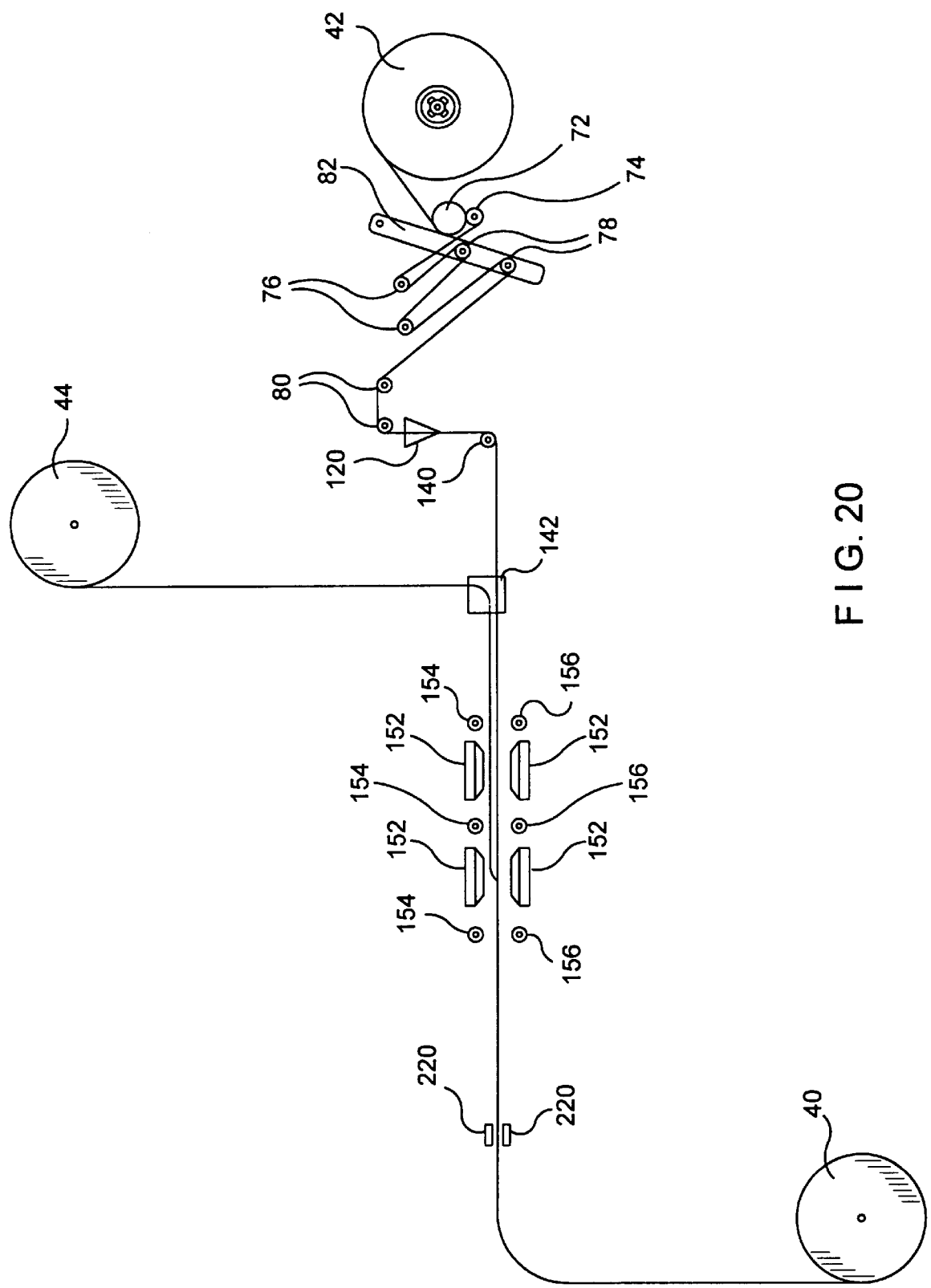
FIG. 20 is a diagram of one embodiment of the present invention for forming the fastener tape described herein.
Figure 21:
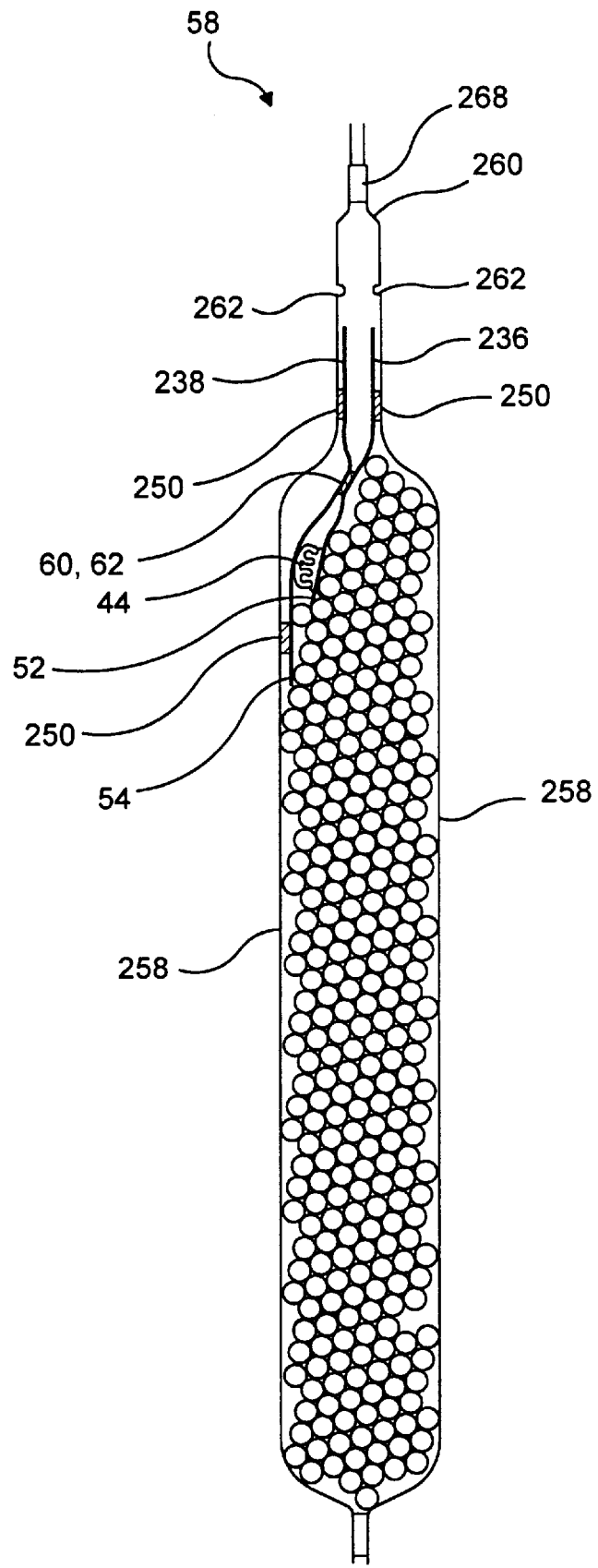
FIG. 21 is a cross-sectional view of one embodiment of a reclosable plastic bag having the fastener tape of FIG. 17.

Referring now to the drawings in which like numerals indicate like elements throughout the several views, FIG. 1 depicts one embodiment of fastener tape fabrication equipment generally designated as 30 comprising a delivery assembly 32, an applicator assembly 34, a tape collection assembly 36 and a profile unwind assembly 38. The delivery assembly 32 is illustrated in greater detail in FIGS. 3 and 4 and the profile unwind assembly 38 is illustrated in greater detail in FIGS. 5–7. FIG. 8 illustrates features of the delivery assembly 32 and the transition to the applicator assembly 34. The applicator assembly 34 is illustrated in greater detail in FIGS. 9–10. FIG. 10 is a modification of FIG. 9. FIGS. 11–16 illustrate features of the applicator assembly 34. FIGS. 2, 17 and 18 are detailed illustrations of the fastener tape 40 and the intermediate layer 42. FIG. 19 is a detailed illustration of the tape collection assembly 36. FIG. 20 is a general diagram of the process of the present invention and FIGS. 21 and 22 are cross-sectional views of exemplary embodiments of a plastic bag having the fastener tape 40 of the present invention.

For fastener tape 40 to be fabricated in an efficient and economical manner, the delivery assembly 32 and applicator assembly 34 should be close to one another and oriented in a manner to easily configure a continuous strip of intermediate layer 42 for receiving a continuous strip of interlocking zipper profile fastener 44. As best shown in FIG. 1, the assemblies 32 and 34 should be oriented at substantially a right angle to one another to facilitate folding of the intermediate layer (FIG. 8). The manner in which the intermediate layer 42 is to be folded is described in greater detail below. The delivery assembly 32 provides the folded intermediate layer 42 with a balanced tension to the applicator assembly 34. The intermediate layer 42 then continuously advances through the applicator assembly 34. The profile unwind assembly 38 should also be oriented at substantially a right angle to the delivery assembly 32 as best shown in FIG. 1. The profile unwind assembly 38 provides the profile fastener 44 with a balanced tension to the applicator assembly 34 as described in greater detail below.

In general, the continuous strip of profile 44 is provided to the applicator assembly 34 by inserting the profile 44 in the fold of the intermediate layer 42. The applicator assembly 34 seals the profile 44 to the intermediate layer 42 to form the fastener tape 40, which is described in greater detail below, and discharges the fastener tape 40 from the applicator assembly 34 to be collected by the tape collection assembly 36. The collection assembly 36 is aligned with the machine direction of the fastener tape 40 exiting applicator assembly 34. The fastener tape 40 is wound-up by the collection assembly 36 (FIG. 19).

FIG. 2 illustrates one embodiment of a roll of intermediate layer 42 of the present invention. For the purposes of describing the present invention, the term "continuous" means a roll of intermediate layer or zipper profile fastener, when used by the fabrication equipment 30 of the present invention, that allows such equipment to operate substantially continuously by replacing an expended roll with another roll of like material without substantially interrupting operations. The intermediate layer 42 is any material known in the industry suitable for attachment with zipper profile fastener. The intermediate layer 42 is preferably a very thin, flexible, substantially flat web material of about 0.003 inches in thickness. It is also possible to use an intermediate layer as thin as 0.001 inches in thickness. The profile 44 is made of any known material in the industry and is of a known configuration which is suitable for attachment to the intermediate layer.

As shown in FIG. 2, the intermediate layer 42 comprises opposite longitudinal edges 46 and 48, opposite exterior surfaces, and a non-sealable barrier 50 coextensive with the intermediate layer 42. The non-sealable barrier 50 is located slightly off-center on one of the exterior surfaces of the intermediate layer 42 and is laterally spaced from the edges 46, 48. The intermediate layer 42 is preferably treated with a printed food grade nitro cellulose coating to form the non-sealable barrier 50.

The positioning of the non-sealable barrier 50 is dependent upon where the intermediate layer 42 will be folded. The intermediate layer 42 is folded lengthwise down the center of non-sealable barrier 50 to form a fold 51 (FIGS. 8, 15 and 17) and upper and lower flanges 52 and 54 respectively (FIGS. 8, 15, 17 and 18). It is preferable that flanges 52 and 54 be of unequal widths as will become apparent when sealing the fastener tape 40 to a reclosable plastic bag 58 (FIGS. 21 and 22). Flanges 52, 54 of unequal width are formed by offsetting the barrier 50 on the intermediate layer 42 and folding the intermediate layer 42 down the center of the barrier 50; rather than the center of the intermediate layer 42 itself.

The intermediate layer 42 shown in FIG. 2 further comprises first and second elongated adhesive surfaces 60 and 62. The adhesive surfaces 60 and 62 seal the opposing sides of the reclosable bag by forming an elongated releasable seal barrier in the bag 58 as will be described in greater detail below. The adhesive surfaces 60, 62 are substantially coextensive and laterally spaced from the edges 46, 48 and the barrier 50. As best shown in FIG. 2, the barrier 50 is substantially oriented between the adhesive surfaces 60, 62 and one of the adhesive surfaces 62 is preferably closer to one of the edges 46 than the other adhesive surface 60 is to the other edge 48. Alternatively, a single adhesive surface on one wall of a plastic bag may be utilized to form a seal barrier with the opposing wall of the plastic bag.

Preferably, an adhesive such as a water based ethyl vinyl acetate (EVA) is used to form the adhesive surfaces 60, 62. Preferably, each of the adhesive surfaces is printed onto the intermediate layer 42 and has a lateral width of approximately ¼ to ⅜ of an inch. Collectively, the adhesive surfaces 60, 62 should have a bonding strength in the range of approximately 600 to 800 grams. Most preferably, the adhesive surfaces 60, 62 should have a bonding strength of approximately 700 grams. In other words, in the preferred embodiment, it should take approximately 700 grams of force to pull apart the seal barrier formed by the adhesive surfaces 60, 62.

Figure 3:
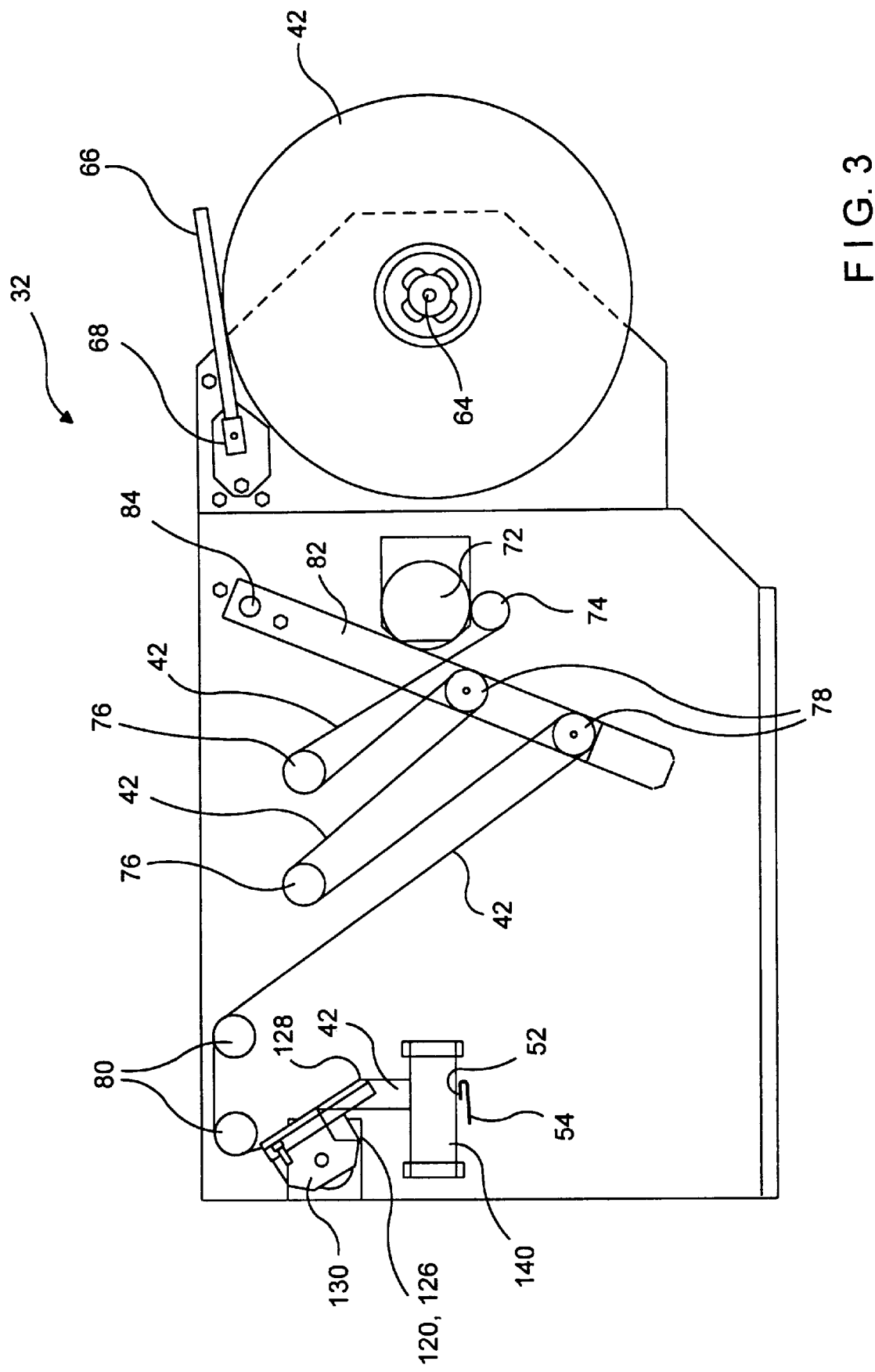
FIG. 3 is a front side view of a plurality of dancer rolls, a pivoting arm and a drive roller to balance the tension of the intermediate layer in FIG. 2 as the intermediate layer is unwound.
Figure 4:
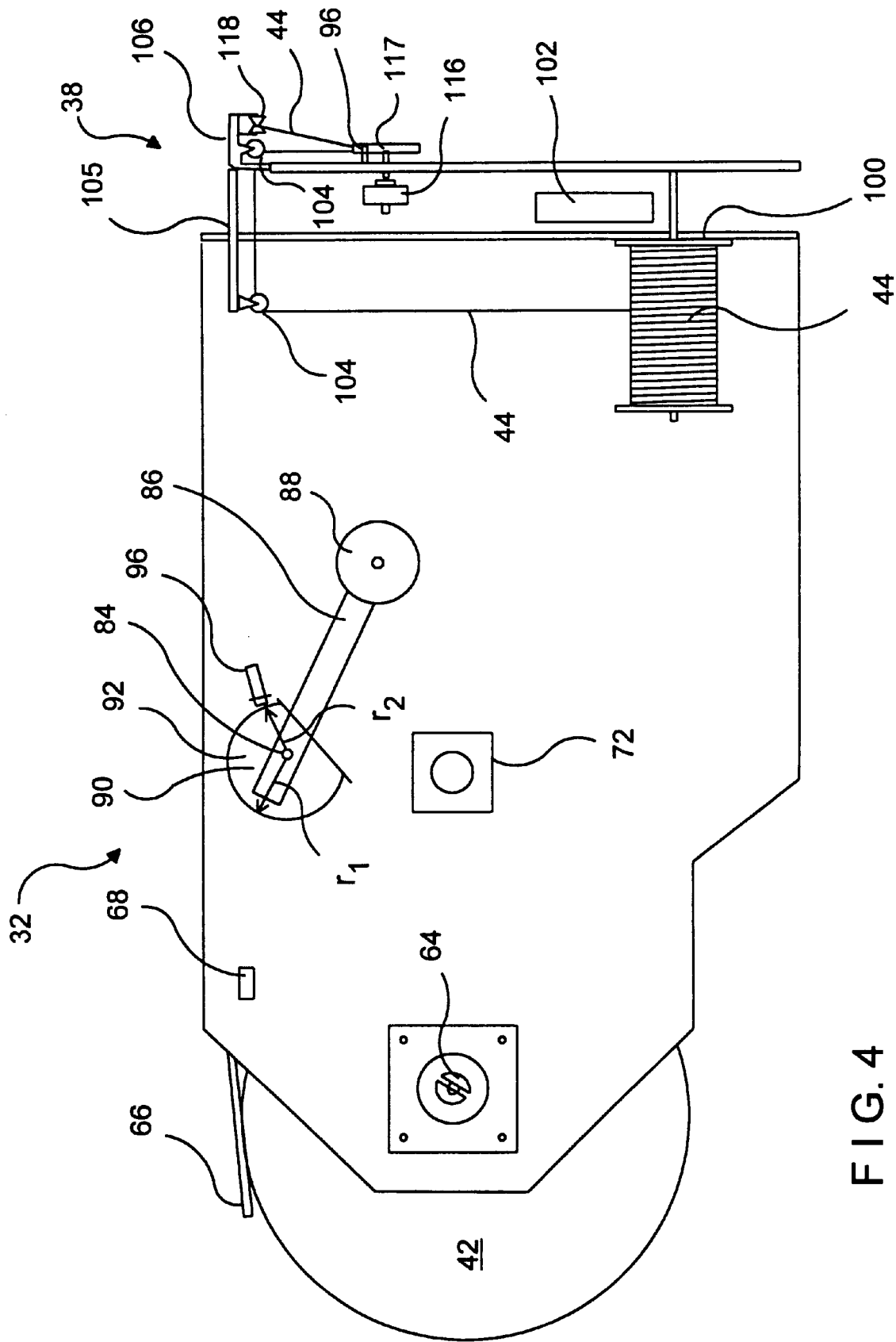
FIG. 4 is a back side view of FIG. 3 illustrating a roll of profile fastener being dispensed and a cam opposite the pivoting arm and rollers in FIG. 3.

FIGS. 3 and 4 illustrate the front and back side views, respectively, of the delivery assembly 32. The intermediate layer 42 is provided on an unwind roll 64. The roll 64 of intermediate layer 42 is rotatably mounted at one end of the delivery assembly 32 and provides the intermediate layer to the delivery assembly 32 at a rate of approximately 75 to 85 feet per minute. Preferably, the intermediate layer is delivered at approximately 80 feet per minute.

The unwind roll is laterally adjustable in relation to the direction of the intermediate layer 42 being unwound from the roll 64. The roll 64 includes an alignment mechanism that has a screw adjustment which adjusts the position of the intermediate layer 42 on the delivery assembly 32. A sensing rod 66 and a sensing rod mount 68 are mounted to the delivery assembly 32 to contact the outer periphery of the roll of intermediate layer 42. The sensing rod 66 is used to determine the amount of intermediate layer 42 remaining on the roll by measuring the radius of the roll of intermediate layer 42 as the intermediate layer is being dispensed.

Figure 9:
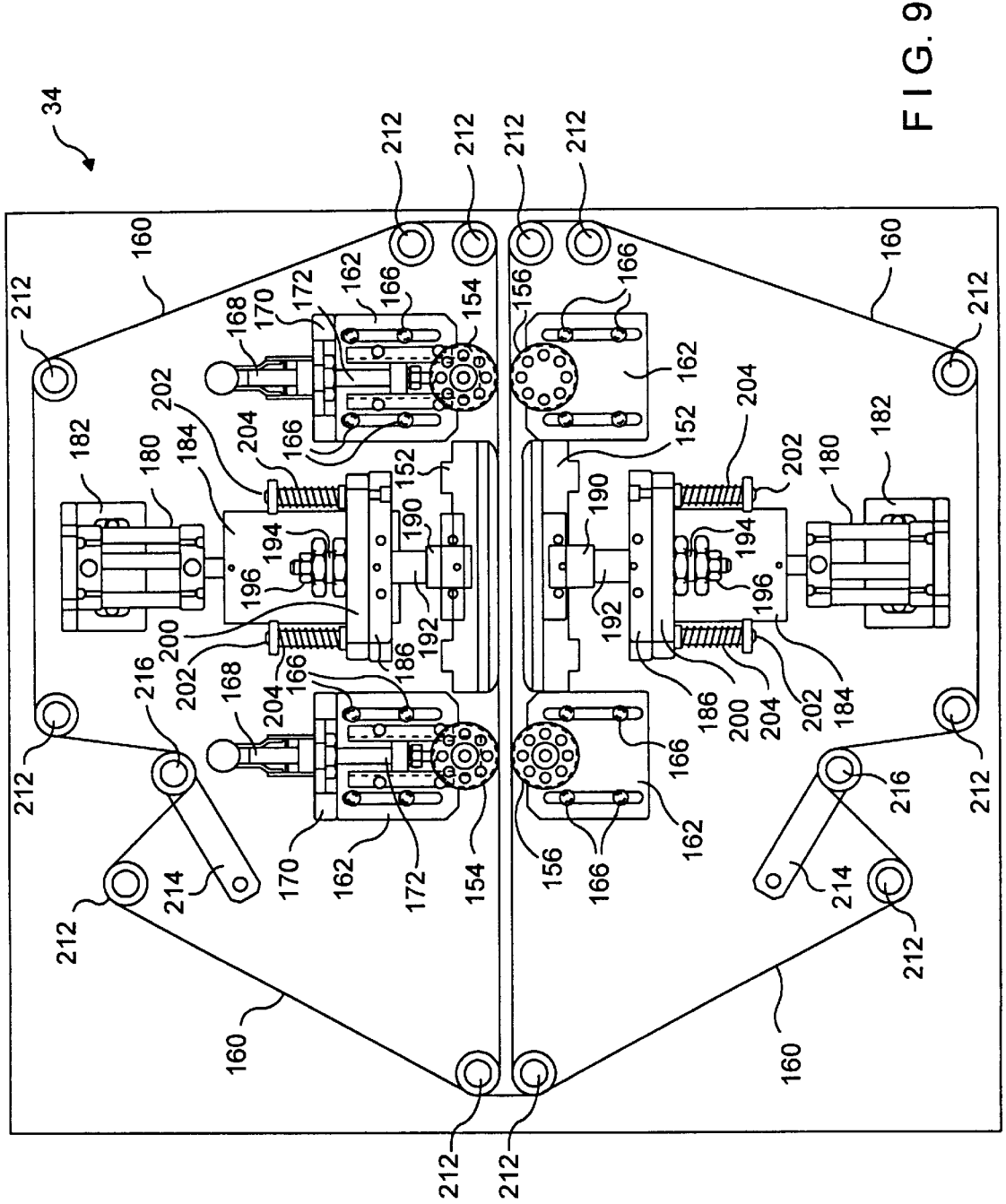
FIG. 9 illustrates one embodiment of the applicator assembly of the present invention having sealing bars, wheels and a pair of drive belts for sealing the profile to the intermediate layer.
Figure 10:
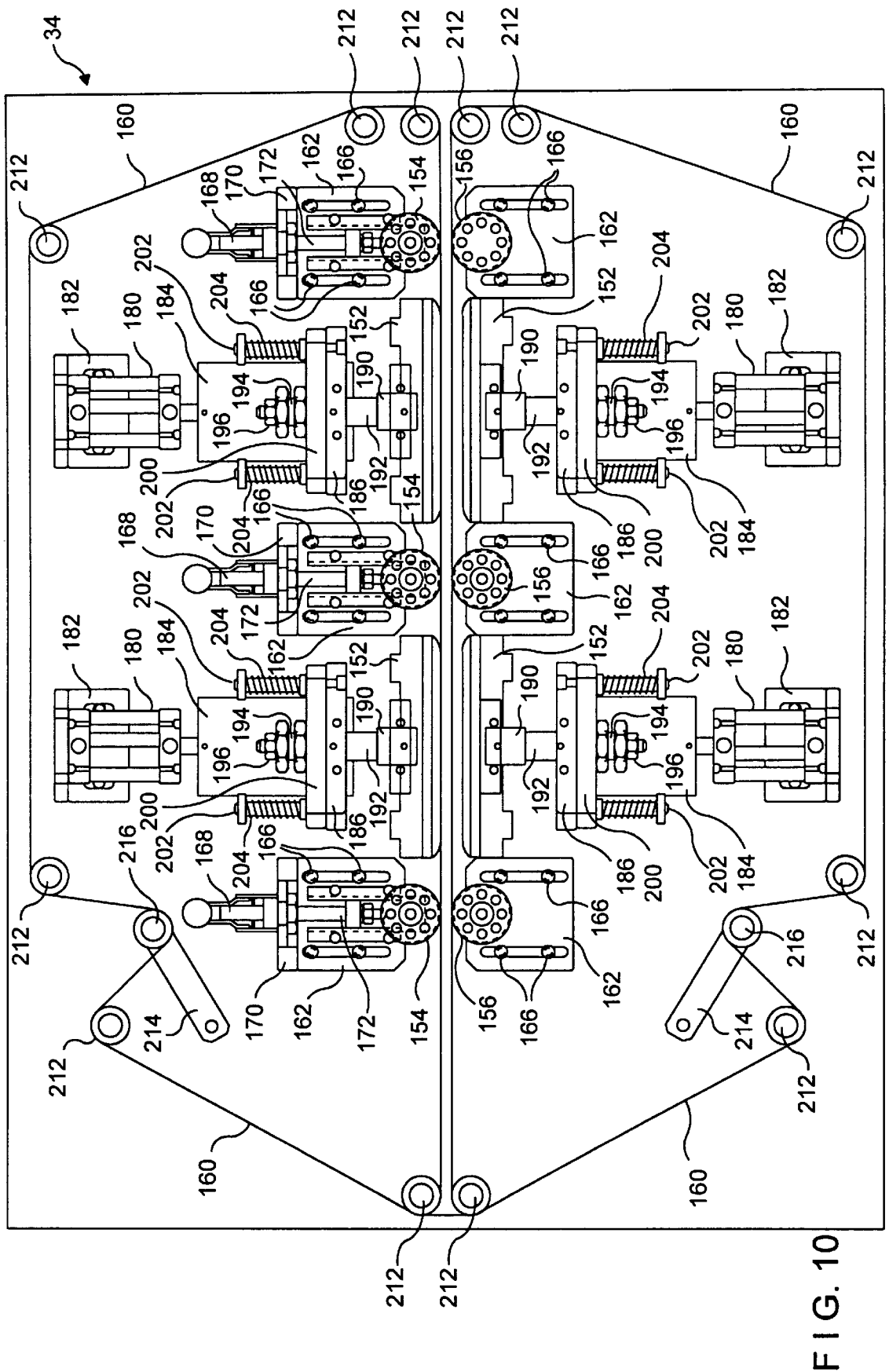
FIG. 10 illustrates a modification of the applicator assembly of FIG. 9 having an additional set of sealing bars and wheels.

The delivery assembly 32 further comprises a delivery system for delivering the intermediate layer 42 to the applicator assembly 34 (FIGS. 9 and 10). The delivery system comprises a motorized drive roller 72 and a plurality of dancer rollers 76, 78, and 80 as described below. The intermediate layer 42 is fed into the motorized drive roller 72 which is fixed about a rotational axis to the delivery assembly 32 and over an axially mounted roller 74 positioned adjacent to the drive roller 72. The intermediate layer 42 then proceeds through upper stationary mounted dancer rollers 76, lower dancer rollers 78, and guide rollers 80. The upper stationary mounted dancer rollers 76 and guide rollers 80 are axially mounted directly to the delivery assembly 32.

The delivery assembly 32 further comprises an adjustment system for balancing the tension of the intermediate layer 42 through the rollers 76, 78 and 80. The adjustment system comprises a pivoting arm 82. The lower dancer rollers 78 are operatively coupled to the distal end of the arm 82. The arm 82 is pivotally coupled to the delivery assembly 32 at an axis 84 and pivots between first and second positions in response to tension of the intermediate layer 42 engaged by the dancer rollers 76, 78. The arm 82 is lowered into the first position and raised into the second position. The lower dancer rollers 78 are displaced from the axis 84.

As shown in FIG. 4, the adjustment system further comprises a second arm 86 pivotally coupled to the back side of the delivery assembly 32 at the axis 84. The arm 86 is rigid in respect to arm 82 on the front side of the delivery. A weight 88 is attached to the distal end of the arm 86 and a cam 90 is attached at the proximal end of the arm 86. The weight 88 on arm 86 is adjustable along the length of the arm 86 to assist in balancing the tension of the intermediate layer 42 between the first and second positions. The cam 90 is rigid with respect to the arms 82, 86 and is rotatable with the arms 82, 86. The cam 90 has a cam surface defined about the axis 84 with an eccentric portion 92 and a radius varying continuously relative to the axis 84 between a longer first radius $r_1$ and a shorter second radius $r_2$. The first and second radiuses $r_1$, $r_2$ substantially correspond with the first and second positions of the arm 82 respectively.

The tension upon the intermediate layer 42 may be adjusted by increasing or decreasing the speed of the motorized roller 72 in response to movement of the cam 90. The cam 90 rotates as the arm 82 moves between the first and second positions. A proximity sensing device 96, fixed to the delivery assembly and directed at the eccentric portion 92 of the cam 90, measures the distance from the cam 90. The distance from the cam 90 changes as the cam rotates about the axis 84. The larger the radius of the cam 90, for example $r_1$, at the point where the proximity sensing device is directed, the closer the cam 90 is to the proximity sensing device 96. The proximity of the cam 90 to the sensing device 96 is used to indicate whether the motorized roller 72 is to speed up or slow down in order to decrease or increase the tension of the intermediate layer 42 between the rollers 76, 78. Proximity sensing devices 96 are available from Turck, Inc., of Minneapolis, Minn., USA, and are referred to as Model Number NI8-M18-LU.

When too much slack is present between the rollers 76, 78, and consequently in the applicator assembly 34, the rollers 78 drop and the arm 82 falls into the first position because of the weight 88 on arm 86. To increase tension, the sensing device 96 senses that the cam 90 has rotated towards $r_1$, the arm 82 having moved toward the first position, and the motorized roller 72 slows down to decrease the amount of intermediate layer 42 dispensed from the unwind roll 64.

On the other hand, to decrease tension, the sensing device 96 senses that the cam has rotated towards $r_2$, indicating the arm 82 has moved into the second position, and the motorized roller 72 speeds up to dispense more of the intermediate layer 42 from the unwind roll 64. When the intermediate layer 42 is too taut in the rollers 76, 78, the arm 86 with weight 88 is raised.

FIG. 4 also illustrates a motorized unwind roll 100 of profile fastener 44 which is axially mounted to the profile unwind assembly 38. FIGS. 5–7 best illustrate the profile unwind assembly 38. A motor 102 drives the unwind roll 100 which varies the rate of speed at which the profile fastener 44 is being unwound from the unwind roll 100. As shown in FIG. 5, profile 44 is unwound from the roll 100 and passes over the top of profile unwind assembly 38 with the aide of a pair of guide rollers 104. The guide rollers 104 are suspended by cantilever members 105 and 106 which are best shown in FIG. 4. The guide roller suspended on cantilever 105 receives the profile fastener 44 from the unwind roll 100. The profile fastener 44 then proceeds over to the guide roller 104 supported on cantilever 106. The profile fastener then proceeds to a roller 108 supported on an arm 110 pivotally mounted on the profile unwind assembly 38 at an axis 112. The arm 110 pivots between first and second positions in response to the tension of the profile fastener 44 in a manner similar to that of the intermediate layer 42 in the delivery assembly 32.

A second pivoting arm 114 is coupled to the axis 112 on the opposite side of the profile assembly 38 having the arm 110. The arms 110 and 114 are rigid with respect to one another. A weight 116 is attached to the distal end of arm 114 as shown in FIG. 5. The weight 116 is adjustable along the length of arm 114 for balancing the tension of the profile fastener 44. A cam 117 is coupled to the proximal end of arm 110 as shown in FIGS. 6 and 7. As the arm 110 pivots, a second proximity device 96, fixed to the profile unwind assembly 38, measures the distance from the cam 117. As the cam rotates in response to the changing tension of the profile fastener 44 and the pivoting of arm 110, the distance between the proximity sensing device 96 and the cam 117 changes. The motor 102 speeds up or slows down in order to decrease or increase the tension of the profile fastener 44 being delivered to the applicator assembly 34. Once the profile 44 leaves roller 108, the profile 44 proceeds to roller 118 which redirects the profile towards the applicator assembly 34. The profile unwind assembly 38 preferably provides the profile 44 to the applicator assembly at approximately 80 feet per minute. The rate of delivery of the intermediate layer 42 and the profile fastener 44 should be approximately the same.

FIGS. 3 and 8 illustrate a panel member 120 having a generally V-shaped configuration defined by an upper surface 122 and first and second convergent edges 124 and 126 respectively. The convergent edges 124, 126 converge towards an apex 128 at the posterior end of the V-shaped panel member 120. The V-shaped panel member 120 is adjustably mounted to the delivery assembly 32 by a mount 130 such that the upper surface 122 is declined. The intermediate layer 42 passes over the upper surface 122 and the convergent edges to define the fold 51 and a fold line 132 at the apex 128. As the intermediate layer 42 passes over the apex 128, the intermediate layer 42 changes directions relative to the direction of the intermediate layer 42 over the upper surface 122. As best shown in FIG. 5, the intermediate layer 42 then passes under a guide roller 140 to fold the intermediate layer 42 onto itself at the fold line 132. The fold line 132 divides the intermediate layer, lengthwise, into two separate continuous strips generally referred to as flanges 52, 54. The guide roller 140 and the V-shaped panel member 120 are spaced apart in a fixed angular relationship as best shown in FIG. 3.

The intermediate layer 42 may be offset to one side of the V-shaped panel member 120 while passing over the upper surface 122 in order to control the width of each flange. The positioning of the intermediate layer upon the V-shaped panel member 120 is controlled by altering the alignment mechanism of roll 64. For example, if the intermediate layer 42 is offset 0.5 inches to either side, one of the flanges will be 1.0 inches wider from the fold line 132 than the other. In one embodiment, the lower flange is 0.75 inches wider than the upper flange. Moreover, if the intermediate layer 42 includes adhesive surfaces 60 and 62, the position of the intermediate layer 42 upon the V-shaped panel member 120 is critical in aligning and mating the adhesive surface 60 with adhesive surface 62.

FIG. 8 also illustrates the profile 44 being inserted between the upper and lower flanges 52, 54 of the intermediate layer 42. A substantially horizontal oriented planar member, generally referred to as a profile insertion assembly 142, is mounted to the applicator assembly 34 with a bracket 144. The profile insertion assembly 142 has a channel 146 for receiving the profile 44. The channel 146 directs the profile 44 between the upper and lower flanges 52, 54. The profile insertion assembly 142 further includes a passage 148 for receiving the profile 44 which intersects with the channel 146 at preferably a 90 degree angle. A ball bearing (not shown) is located at the point of intersection to reduce friction between the profile 44 and the profile insertion assembly 142. The passage 148 redirects the profile 44 from the channel 146 into the machine direction of the intermediate layer 42 and positions the profile 44 substantially parallel with and at a predetermined distance from the fold line 132. Preferably, the profile 44 is laterally displaced from the fold line 132 after exiting the passage 148 by approximately 1.25 inches.

FIG. 9 illustrates one embodiment of the applicator assembly 34 of the present invention. FIG. 9 depicts a pair of vertically opposed elongated sealing bars 152 supported on the applicator assembly 34 which are moveable with respect to each other. The sealing bars are preferably 6 inch elongated portions of machined ductile iron with a coated finish called magnaplating. The sealing bars 152 are heated in order to thermally seal the profile fastener 44 to the intermediate layer 42. The sealing bars 152 are heated to a temperature in the range of approximately 500 to 600° F. when thermally sealing profile 44 to the intermediate layer 42.

The sealing bars 152 are moveable with respect to each other from a spaced clearance position into a clamping and sealing position in relation to the intermediate layer 42 and the profile 44 therebetween. While in the sealing and clamping position, there is preferably a gap of approximately 0.057 inches between the opposed sealing bars when heated to operating temperatures. The profile 44 is secured to the intermediate layer 42 when the sealing bars 152 are in the clamping and sealing position. The securing of the profile 44 to the intermediate layer 42 forms the fastener tape 40 (FIGS. 17 and 18).

As shown in FIG. 9, the applicator assembly 34 further comprises a plurality of upper and lower rotating wheels 154 and 156, respectively, supported on the applicator assembly 34. The upper wheels 154 oppose lower wheels 156. The wheels 154, 156 are unique in that each includes a circumferential grove 158 sized for receiving the profile 44 therein when the wheel 154, 156 is pressed against the profile 44 and the intermediate layer 42. A pair of belts 160, described in greater detail below, are also positioned between the wheels 154, 156 and the profile 44. Thus, the wheels 154, 156 do not actually contact the intermediate layer 42 or profile 44.

Figure 12:
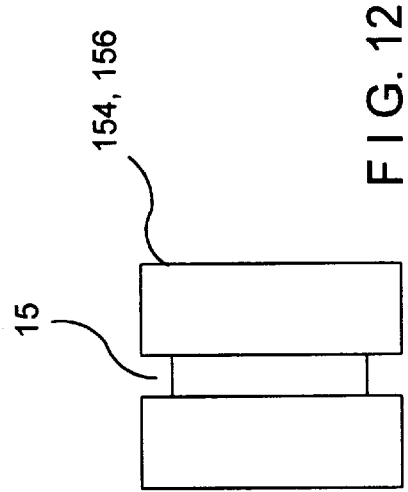
FIG. 12 is a side view of the wheels of FIGS. 9–11.
Figure 11:
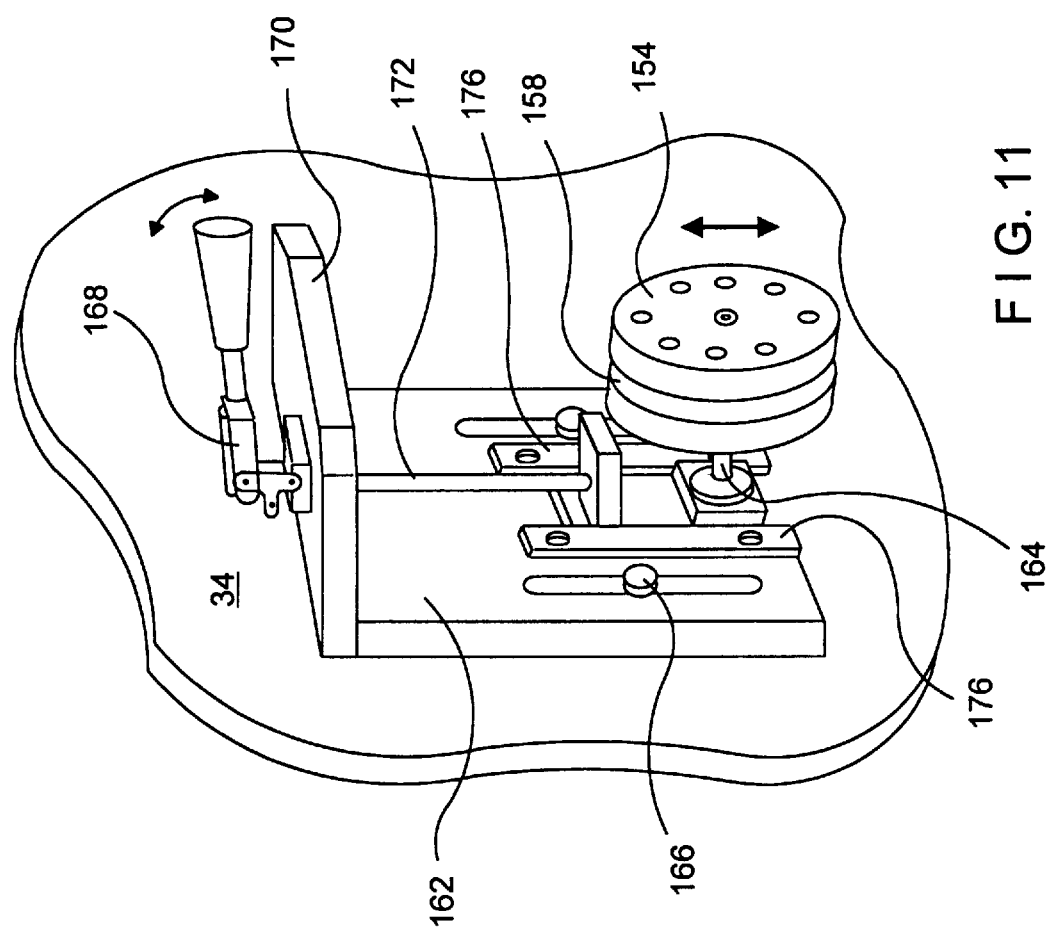
FIG. 11 is a front perspective view of one embodiment of a wheel capable of translating in the vertical direction.

FIGS. 11 and 12 illustrate one embodiment of the wheels 154, 156 of the present invention. The lower wheels 156 are axially mounted to a generally planar member 162. The planar members 162 are mounted with fasteners 166 to the applicator assembly 34. The upper wheels 154 are movably coupled to the planar member 162 and applicator assembly 34. As shown in FIG. 11, a spring or cam-loaded two-position handle assembly 168 is mounted on top of a planar member 170 which extends outwardly from the applicator assembly 34. The handle assembly 168 is attached to one end of a shaft 172 which extends through member 170. The other end of the shaft 172 is attached to a flanged bearing member 174 which slides between and is retained by a pair of rails 176. An axis 164 of the wheel 154 is rotatably attached to the flanged bearing member 174. Throwing the handle 168 raises and lowers the wheels 154 into the spaced clearance position and the clamping and sealing position respectively. Alternatively, the lower wheels 156 may be similarly coupled to the applicator assembly 34. However, if the wheels 154 may be sufficiently displaced from the intermediate layer 42 and profile 44 by raising wheels 154, it is preferable to mount the wheels 156 directly to their respective planar members 162.

Conventional air cylinders 180 are utilized to move the sealing bars 152 between the spaced clearance position and the clamping and sealing position. The air cylinders 180 are mounted on cylinder mounts 182. It is preferable that each air cylinder 180 operate off of a separate regulator (not shown). Also, it is preferred that each pair of air cylinders, for operating a pair of opposed sealing bars, collectively provide pressure in the range of approximately 15 to 20 pounds per square inch. The cylinder mounts 182 are mounted directly to the applicator assembly 34. Slide plates 184 are slidably mounted to the applicator assembly 34 such that each air cylinder 180 can slide each slide plate 184 up and down on the applicator assembly 34. Slide plates 184 are available from W. M. Berg, Inc., in East Rockaway, N.Y., USA and are referred to as Model Number LBSD-20. Extending outward from each slide plate 184 is a seal bar mount 186. From each seal bar mount 186 vertically extends a yoke assembly 190 for attaching the sealing bar 152 to the sealing bar mount 186. The yoke assembly 190 allows the sealing bar 152 to pivot in the machine direction such that an equal amount of pressure is exerted upon the intermediate layer 42 along the length of the sealing bar 152.

A threaded shaft 192 extending vertically from the yoke assembly 190 passes through the sealing bar mount 186 and is threadedly secured with an adjusting screw 194 and nut 196 to a floating plate 200. Passing through the opposite ends of the floating plate 200 and attached to the opposite ends of the sealing bar mount 186 are guide shafts 202. Each shaft 202 has a compression spring 204. The floating plate 200, in conjunction with the springs 204 and guide shafts 202, force the sealing bars 152 towards the intermediate layer 42 during operation.

FIG. 10 is a modification of the applicator assembly 34 of FIG. 9. As shown in FIG. 10, the applicator assembly 34 may include a second set of sealing bars 152. However, the second set of sealing bars 152 can serve the same or a different purpose than the sealing bars 152 previously described. When serving the same purpose, the sealing operation can be performed at a higher rate of speed. When serving a different purpose, the second set of sealing bars 152 should have a different raised sealing surface. An applicator assembly 34, having but a single set of sealing bar, uses the solitary set of sealing bars to seal profile fastener 44 to intermediate layer 42. On the other hand, a second set of sealing bars 152 may be used to seal alternative materials, such as an adhesive, to the intermediate layer.

For example, there are two sets of sealing bars 152 illustrated in FIG. 10. The second set of sealing bars illustrated in FIG. 10 are used to seal the adhesive surface 60 to the adhesive surface 62 to form an elongated seal barrier (FIGS. 17 and 18). The sealing bars 152 should have a sealing surface configured for the particular material intended to be sealed to the intermediate layer. The sealing surface of the second set of sealing bars 152 are offset from the sealing surface of the first set of sealing bars 152. It is necessary to misalign the sealing surfaces in respect to one another because each set of sealing bars 152 seal along different lateral distances of the intermediate layer 42.

Figure 13:
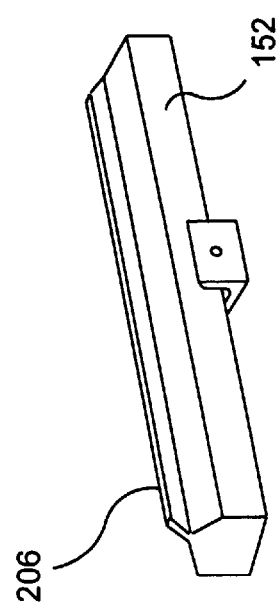
FIGS. 13 and 14 are front perspective views of sealing bars having different sealing surfaces.
Figure 14:
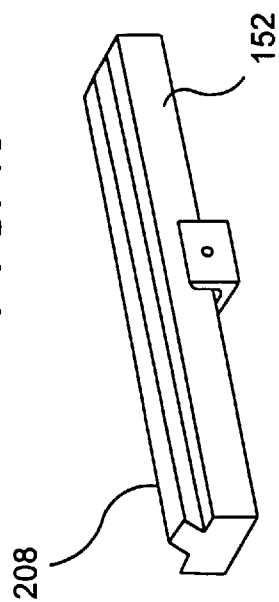

The sealing bar 152 illustrated in FIG. 13 has a sealing surface 206 and the sealing bar 152 illustrated in FIG. 14 has a sealing surface 208. The sealing surfaces 206, 208 extend substantially the entire length of the sealing bars 152. The sealing surface 206 is substantially narrower in width than the sealing surface 208. Preferably, sealing surface 206 should have a width of approximately 0.09 inches. Sealing surface 208 should have a width of approximately 0.25 inches. The sealing surface 206 is configured for sealing the profile 44 to the intermediate layer 42 and the sealing surface 208 is configured for sealing adhesive surfaces such as adhesive surface 60 to adhesive surface 62. The temperature of the sealing bars 152 for sealing adhesive surfaces may be reduced compared to the temperature required to seal profile to intermediate layer. In order to seal adhesive surfaces, the sealing plates should have a temperature in the range of approximately 245 to 300° F.

As best shown in FIG. 8 and FIGS. 9 or 10, the applicator assembly 34 further comprises the pair of belts 160 spanning over a plurality of rollers 212. The belts 160 are preferably Teflon coated fabric belts. As shown in FIG. 9 or 10, a length of each of the universal belts 160 abut one another. The intermediate layer 42, profile 44 and belts 160 proceed between the wheels 154, 156 and the sealing bars 152. The belts 160 are required to have a larger width when used in conjunction with two sets of sealing bars 152 because the first set of sealing bars 152 are offset from the second set of sealing bars 152 as described above.

The rollers 212 axially extend from the applicator assembly 34 and are displaced from one another. For each belt 160 there is a tensioning arm 214 and roller 216. The rollers 216 axially extends from the distal end of the tensioning arms 214. The proximal ends of the tensioning arms 214 are pivotally mounted to the applicator assembly 34. The tensioning arms 214 are spring loaded so that the tension of each belt is automatically maintained by the tensioning arms 214 as the belts become worn.

Figure 15:
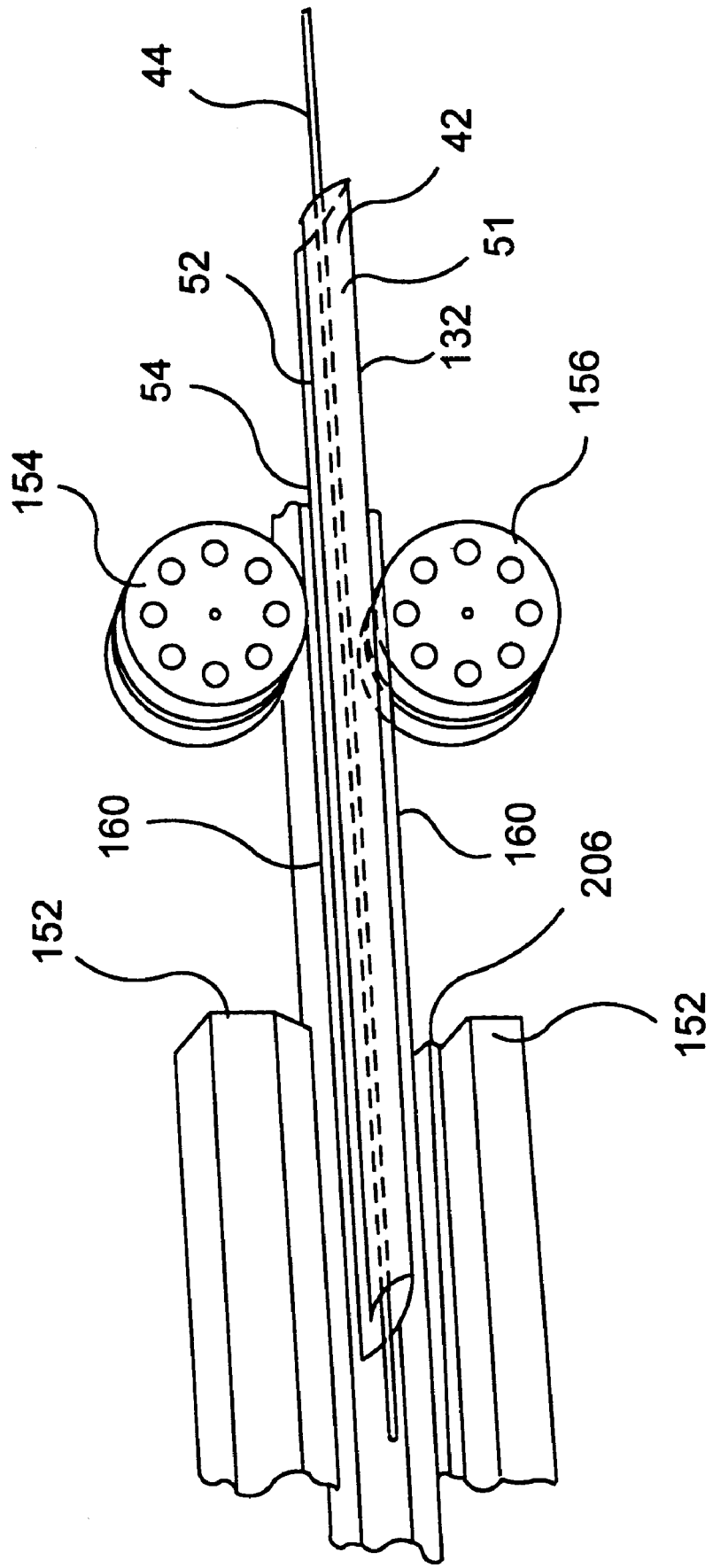
FIG. 15 is partial front perspective view of the profile placed within the fold of the intermediate layer and oriented between a pair of wheels which are displaced somewhat from the profile and intermediate layer for illustration purposes.

FIG. 15 illustrates a profile 44 being aligned between the upper and lower flanges 52, 54 of the intermediate layer 42. During operation of the applicator assembly 34, the folded intermediate layer 42, with the profile 44 between the flanges 52, 54 of the intermediate layer 42, are provided to the sealing bars 152 by the rotation of the belts 160 about rollers 212, 216. The grooves 158 of the wheels 154, 156 capture the profile 44 and properly align the profile 44 for engagement with the sealing surface 206. As mentioned above, the sealing bars 152 seal the profile 44 to the intermediate layer 42 without actually touching the intermediate layer 42 or the profile 44 because the belts 160 are positioned between the sealing bars 152 and the intermediate layer 42 and the profile 44. In FIG. 15, the wheels 154, 156 and the belts 160 are displaced from the folded intermediate layer 42 for illustration purposes.

Figure 16:
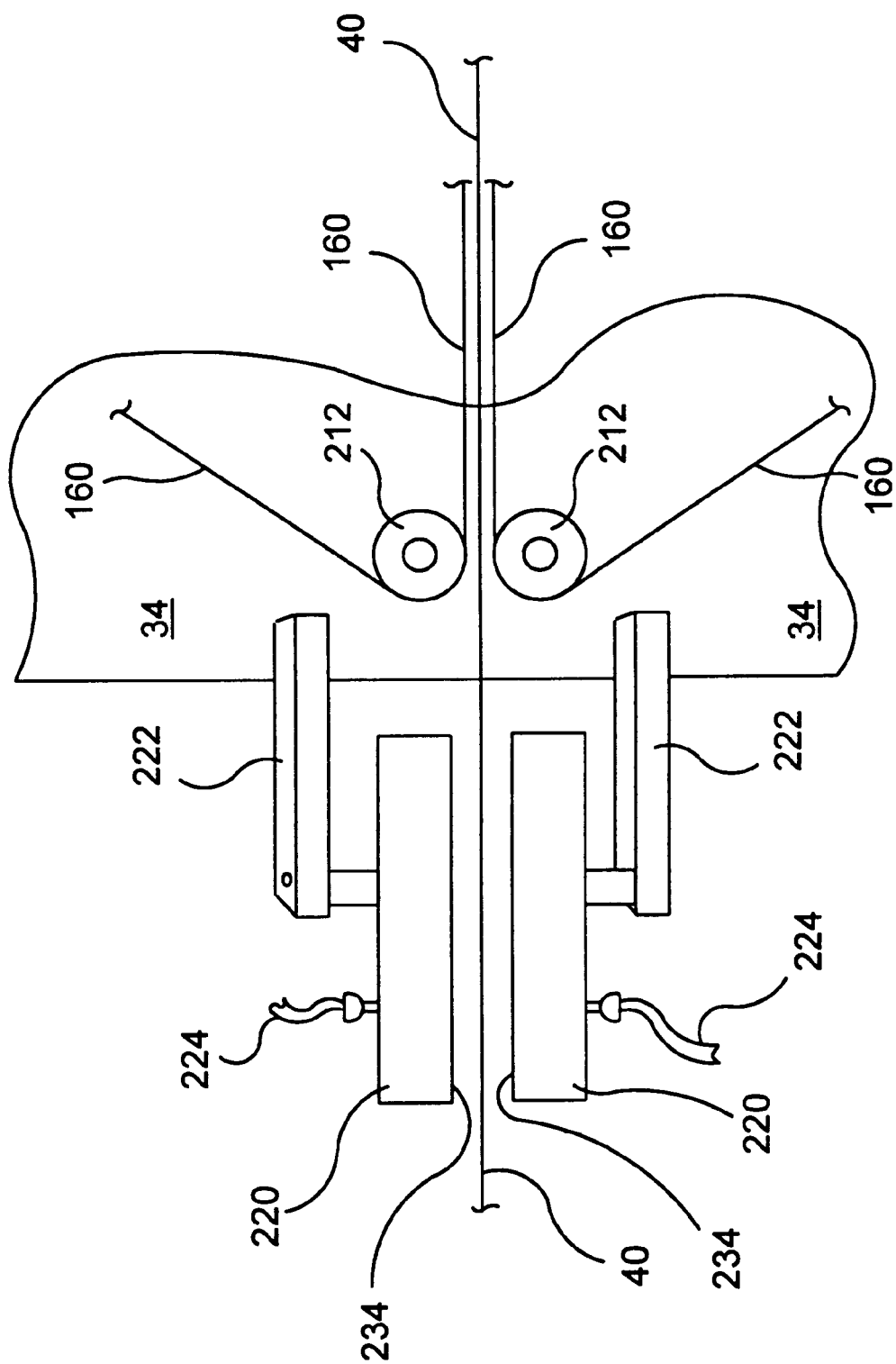
FIG. 16 is a front side view of one embodiment of the cooling blocks of the present invention.

In the preferred embodiment of the present invention, once the profile 44 has been sealed to the intermediate layer 42 and the adhesive surfaces 60, 62 have been sealed to one another to form the fastener tape 40, the fastener tape 40 proceeds to a pair of cooling blocks 220. The cooling blocks 220 prevent the fastener tape 40 from becoming deformed from extended exposure to heat. FIG. 16 illustrates the cooling blocks 220 with the fastener tape 40 therebetween as the fastener tape 40 leaves the applicator assembly 34. The cooling blocks 220 are mounted to the applicator assembly 34 by mounting plates 222.

Compressed air is provided at approximately 100 pounds per square inch through air lines 224 to the upper and lower cooling blocks 220 in order to cool the fastener tape 40 after having undergone the sealing processes. Preferably, the cold air should be at least cooler than ambient air. Most preferably, the temperature of the cold air should approach approximately 0° F. The cold air is directed downward on to the fastener tape 40. Cooling blocks 220 are available from I.T.W. Vortex, Cincinnati, Ohio. An alternative to the cooling blocks 220 of the present invention, would be to route the fastener tape 40 through chilled rollers (not shown) to dissipate heat.

In the preferred embodiment, as the fastener tape 40 proceeds from the cooling blocks 220, a sharpened blade (not shown), aligned parallel with the machine direction of the fastener tape 40, is positioned to contact and cut the intermediate layer 42 at the fold line 132 and divide the portion of the intermediate layer treated with the non-sealable barrier 50 into two separate continuous portions generally referred to as a lip 236 and opposite wall 238. The lip 236 and opposite wall 238 are shown in FIGS. 17 and 18. The sharpened blade removes the fold 51 created by fold line 132 from the fastener tape 40. Once the intermediate layer 42 has been cut along the fold line 132, the intermediate layer 42 becomes two separate continuous portions joined together by the continuous profile 44. FIG. 17 illustrates the fastener tape 40 having the fold 51 and FIG. 18 illustrates the fastener tape 40 free of the fold 51 shown in FIG. 17.

The fabricated fastener tape 40 proceeds from the cooling bars 220 and the applicator assembly 34 to the tape collection assembly 36 shown in FIG. 19. The fastener tape 40 is collected on a powered windup roll 240. A plurality of rollers 242 axially extend from the face of a stand 244 of the tape collection assembly 36. The positioning of the rollers 242 on the stand 244 are self-aligning. The rollers 242 may slide along their axis.

FIG. 20 illustrates a simplified and general diagram of one embodiment of the present invention 30. The use of fastener tape fabrication equipment to manufacture fastener tape for attachment in the opening of a reclosable bag constitutes an inventive method of the present invention in addition to the fabrication equipment itself. In practicing one embodiment of the method of fabricating fastener tape as described above, the steps include dispensing a continuous strip of intermediate layer 42. The method then includes the step of delivering the intermediate layer to the applicator assembly 34, as described above. The invention also includes the step of folding the intermediate layer 42 to obtain a fold 51 as described above. After the folding step, the method includes the step of inserting the profile 44 into the fold 51 as described above. The method then includes the step of attaching the profile fastener 44 to the intermediate layer 42. As described above, the step of attaching the profile 44 to the intermediate layer 42 is accomplished by aligning the profile fastener 44 with the intermediate layer 42 and sealing the profile fastener 44 to the intermediate layer 42 to form the continuous strip of fastener tape 40.

The method may also include the steps of adjusting the tension of the intermediate layer and/or the profile fastener being delivered to the applicator assembly 34 as described above. The method may also include the step of cooling the fastener tape 40 in response to sealing the profile 44 to the intermediate layer 42. Also, the method may include the step of slitting the intermediate layer 42 along the fold line 132 to form two separate portions of intermediate layer 42. The method of the present invention may also include the step of collecting the continuous strip of fastener tape 40 in response to forming the fastener tape 40 as described above.

The faster tape 40 of the present invention, fabricated in accordance with the above identified apparatus and process, may be utilized in the manufacture of plastic bags by attaching the fastener tape 40 to form the plastic bag 58 as shown in FIGS. 2 1 and 22. The process and apparatus for attaching fastener tape to fabricate a reclosable plastic bag are described in greater detail in copending U.S. patent application having U.S. Ser. No. 08/899,434 filed on Jul. 24, 1997, and entitled "Fastener Tape Material, Bag Utilizing Fastener Tape Material, and Method of Manufacture Thereof", the entire disclosure of which is incorporated herein by reference.

As shown in FIGS. 21 and 22, to form the reclosable plastic bag 58, the fastener tape 40 is attached to a base material 258. The fastener tape 40 is attached to the base material 258 by sealing the lower flange 54, lip 236 and opposite wall 238 to the base material 258. The seals between the base material 258 and the lower flange 54, lip 236 and opposite wall 238 are generally designated as the reference numeral 250. The seals 250 are made in accordance with the disclosure contained within the above-identified incorporated reference. Note, however, that the flange 52 is not sealed to the base material 258. Therefore, flange 52 is not required to be as wide as flange 54.

When sealed, the adhesive surfaces 60, 62 form an elongated releasable seal barrier above the profile 44 for sealing the opposing sides of a plastic bag as shown in FIGS. 21 and 22. The seal barrier is commonly referred to as a peel seal and is primarily intended as an additional barrier against contaminants when a bag also includes a tear strip 260 formed by a row of perforations 262 along the top of the plastic bag 58. The product in the bag 58 determines whether the bag 58 has a tear strip 260. The peel seal of the plastic bag 58 hermetically seals in the contents of the bag until the consumer opens the plastic bag 58 from the top. The perforations 262 should be laterally displaced above the peel seal and profile 44. The consumer simply tears away the tear strip 260 along the row of perforations 262 and pulls apart the peel seal and the profile to gain access to the plastic bag 58.

FIG. 22 illustrates a modification of the bag 58 shown in FIG. 21. In FIG. 22, a portion of the fold 51 is configured to be included in the seal 270 at the top of the bag 58 to facilitate opening of the bag 58. Alternatively, a fastener tape 40, having been cut along the fold line 132, may also be included in the seal 270. Perforations may be included in the fold 51 so that the portion of the fastener tape included in the seal 270 is tore away when removing the tear strip 260. In FIG. 22, both the lip 236 and opposite wall 238 include a row of perforations 272 which are aligned parallel with perforations 262. The tear strip 260 can be removed from the bag 58 by tearing along perforations 262 and 272.

The present invention has been illustrated in great detail by the above specific examples. It is to be understood that these examples are illustrative embodiments and that this invention is not to be limited by any of the examples or details in the description. Those skilled in the art will recognize that the present invention is capable of many modifications and variations without departing from the scope of the invention. Accordingly, the detailed description and examples are meant to be illustrative and are not meant to limit in any manner the scope of the invention as set forth in the following claims. Rather, the claims appended hereto are to be construed broadly within the scope and spirit of the invention.

What is claimed is:

1. A fastener tape for carrying profile fasteners to be mounted in an opening in a reclosable bag having opposing sides, said fastener tape comprising:
   an intermediate layer having opposite longitudinal edges;
   an elongated non-sealable barrier substantially longitudinally coextensive with said intermediate layer and laterally spaced from said edges; and
   a releasable interlocking profile fastener on said intermediate layer, said profile fastener substantially longitudinally coextensive with said intermediate layer and laterally spaced from said edges and said non-sealable barrier.

2. The fastener tape of claim 1 further comprising an elongated releasable seal barrier on said intermediate layer for sealing the opposing sides of the reclosable bag.

3. The fastener tape of claim 1 wherein said non-sealable barrier is printed on said intermediate layer.

4. The fastener tape of claim 1 wherein said non-sealable barrier is laminated onto said intermediate layer.

5. The fastener tape of claim 1 wherein said non-sealable barrier is co-extruded with said intermediate layer.

6. The fastener tape of claim 1 wherein said non-sealable barrier is nitro cellulose.

7. The fastener tape of claim 1 wherein said intermediate layer is defined by a lip, a fold connected to said lip, an opposite wall connected to said fold, and a lower flange connected to said opposite wall, and said lip, opposite wall and lower flange having an outer surface capable of being sealed to the bag.

8. The fastener tape of claim 7 wherein a portion of said fold is coupled between the opposing sides of the reclosable bag when forming the reclosable bag.

9. The fastener tape of claim 7 wherein said lip and said opposite wall are coupled between the opposing sides of the reclosable bag when forming the reclosable bag.

10. The fastener tape of claim 7 wherein said profile fastener is connected to said intermediate layer between an inner surface of said lip and said opposite wall.

11. The fastener tape of claim 7 further defined by an upper flange connected to said lip.

12. The fastener tape of claim 11 wherein said seal barrier is connected to said intermediate layer between said upper and lower flanges.

13. The fastener tape of claim 11 wherein said releasable seal barrier comprises first and second elongated adhesive surfaces on said lower and upper flanges respectively, said first and second adhesive surfaces opposing one another and coupling the opposing sides of the reclosable bag to one another when said first and second adhesive surfaces are aligned and sealed to one another.

14. The fastener tape of claim 11 wherein said seal barrier comprises an elongated adhesive surface on one side of said lower and upper surfaces, said adhesive surface for coupling opposing sides of a reclosable bag to one another.

15. The fastener tape of claim 13 wherein said first and second adhesive surfaces have a combined bonding strength in the range of approximately 600 to 800 grams in order to couple the opposing sides of the reclosable bag to one another.

16. The fastener tape of claim 15 wherein said adhesive surface has a bonding strength in the range of approximately 600 to 700 grams in order to couple the opposing sides of the reclosable bag to one another.

17. The fastener tape of claim 13 wherein the lateral width of each said first and second adhesive surface is approximately ⅜ of an inch.

18. The fastener tape of claim 15 wherein the lateral width of said adhesive surface is approximately ⅜ of an inch.

19. An intermediate layer for carrying profile fasteners having opposite exterior surfaces and opposite longitudinal edges, said intermediate layer comprising:

an elongated non-sealable barrier on one of said exterior surfaces, said non-sealable barrier substantially longitudinally coextensive with said intermediate layer and laterally spaced from the edges;

a first elongated adhesive surface on said one of said exterior surfaces, said first adhesive surface substantially longitudinally coextensive with said intermediate layer and laterally spaced from the edges; and a second elongated adhesive surface substantially coextensive and laterally spaced from the edges and said first adhesive surface, said first and second adhesive surfaces for coupling together the opposing sides of a reclosable bag, said first adhesive surface closer to one of the edges than said second adhesive surface is to the other edge, and said non-sealable barrier substantially between said first and second adhesive surfaces.

* * * * *